United States Patent
Hatta et al.

(10) Patent No.: US 12,092,537 B2
(45) Date of Patent: *Sep. 17, 2024

(54) PRESSURE MEASURING MATERIAL

(71) Applicant: FUJIFILM Corporation, Tokyo (JP)

(72) Inventors: Masahiro Hatta, Shizuoka (JP); Hiroshi Kawakami, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,182

(22) Filed: Jul. 24, 2023

(65) Prior Publication Data

US 2023/0358624 A1 Nov. 9, 2023

Related U.S. Application Data

(63) Continuation of application No. 17/373,812, filed on Jul. 13, 2021, now Pat. No. 11,754,453, which is a
(Continued)

(30) Foreign Application Priority Data

Jan. 17, 2019 (JP) ................. 2019-006244

(51) Int. Cl.
*G01L 1/24* (2006.01)
(52) U.S. Cl.
CPC .............. *G01L 1/247* (2013.01); *G01L 1/242* (2013.01)
(58) Field of Classification Search
CPC ......... G01L 1/247; G01L 1/242; G01L 11/02; G01L 5/00; B41M 5/124; B41M 5/165
See application file for complete search history.

(56) References Cited

U.S. PATENT DOCUMENTS

| 4,104,910 A | 8/1978 | Ogata et al. |
| 6,746,984 B2 * | 6/2004 | Suzuki ..................... B41M 5/30 |
| | | 503/215 |

(Continued)

FOREIGN PATENT DOCUMENTS

| CN | 101743461 | 6/2010 |
| CN | 102917883 | 2/2013 |

(Continued)

OTHER PUBLICATIONS

"International Search Report (Form PCT/ISA/210) of PCT/JP2020/001578," mailed on Mar. 24, 2020, with English translation thereof, pp. 1-5.

(Continued)

*Primary Examiner* — Freddie Kirkland, III
(74) *Attorney, Agent, or Firm* — JCIPRNET

(57) ABSTRACT

Provided is a pressure measuring material having a substrate and a pressure-sensitive layer, wherein the pressure-sensitive layer contains a polymer matrix containing a polymer compound having a molecular weight of 1,000 or more, and microcapsules encapsulating an electron-donating dye precursor and a solvent, and an electron-accepting compound. The pressure-sensitive layer has a color development-inducing layer having the electron-accepting compound and the polymer matrix and a color-developing layer having the microcapsules. A thickness of the color-developing layer is equal to or less than ½ of a thickness of the color development-inducing layer.

14 Claims, 2 Drawing Sheets

Related U.S. Application Data continuation of application No. PCT/JP2020/001578, filed on Jan. 17, 2020.

(56) References Cited

U.S. PATENT DOCUMENTS

| | | | | |
|---|---|---|---|---|
| 8,349,766 | B2* | 1/2013 | Ohga | B41M 5/44 503/226 |
| 8,623,785 | B2 | 1/2014 | Takahama et al. | |
| 9,676,969 | B2 | 6/2017 | Nakako et al. | |
| 10,272,708 | B2* | 4/2019 | Fujita | B41M 5/44 |
| 11,754,453 | B2* | 9/2023 | Hatta | G01L 11/02 73/760 |
| 2010/0184233 | A1 | 7/2010 | Watanabe et al. | |
| 2011/0092365 | A1* | 4/2011 | Ohga | B41M 5/44 503/226 |
| 2018/0043717 | A1* | 2/2018 | Fujita | B41M 5/44 |
| 2018/0104973 | A1 | 4/2018 | Greener | |
| 2019/0219464 | A1 | 7/2019 | Tanaka | |
| 2020/0096400 | A1* | 3/2020 | Kato | B32B 7/02 |
| 2020/0096401 | A1 | 3/2020 | Kato | |
| 2021/0341345 | A1* | 11/2021 | Hatta | G01L 1/247 |
| 2022/0080759 | A1 | 3/2022 | Tanaka | |

FOREIGN PATENT DOCUMENTS

| | | |
|---|---|---|
| CN | 103733277 | 4/2014 |
| CN | 108373548 | 8/2018 |
| JP | S5288380 | 7/1977 |
| JP | S55103437 | 8/1980 |
| JP | 2009019949 | 1/2009 |
| WO | 2018062017 | 4/2018 |
| WO | 2018164080 | 9/2018 |
| WO | 2018221168 | 12/2018 |

OTHER PUBLICATIONS

"Written Opinion of the International Searching Authority (Form PCT/ISA/237)" of PCT/ JP2020/001578, mailed on Mar. 24, 2020, with English translation thereof, pp. 1-15.

"Notice of Reasons for Refusal of Japan Counterpart Application", with English translation thereof, issued on Nov. 24, 2021, pp. 1-9.

"Search Report of Europe Counterpart Application", issued on Jan. 18, 2022, pp. 1-11.

"Notice of Reasons for Refusal of Japan Counterpart Application", with English translation thereof, issued on Apr. 5, 2022, pp. 1-20.

"Decision of Refusal of Japan Counterpart Application", with English translation thereof, issued on Jul. 26, 2022, pp. 1-9.

"Office Action of China Counterpart Application", with English translation thereof, issued on Sep. 9, 2022, pp. 1-20.

"Office Action of Counterpart U.S. Appl. No. 17/373,812", issued on Jan. 5, 2023, pp. 1-35.

"Notice of Allowance of Counterpart U.S. Appl. No. 17/373,812", issued on May 5, 2023, pp. 1-7.

"Office Action of Europe Counterpart Application", issued on Jan. 23, 2024, p. 1-p. 7.

* cited by examiner

PRESSURE MEASURING MATERIAL

CROSS-REFERENCE TO RELATED APPLICATION

This application is a continuation application of and claims the priority benefit of a prior application Ser. No. 17/373,812, filed on Jul. 13, 2021, the disclosure of which is incorporated herein by reference in its entirety. The prior application Ser. No. 17/373,812 is a continuation application of International Application No. PCT/JP2020/001578, filed Jan. 17, 2020, the disclosure of which is incorporated herein by reference in its entirety. Further, this application claims priority from Japanese Patent Application No. 2019-006244, filed Jan. 17, 2019, the disclosure of which is incorporated herein by reference in its entirety.

BACKGROUND OF THE INVENTION

1. Field of the Invention

The present disclosure relates to a pressure measuring material and a method for manufacturing a pressure measuring material.

2. Description of the Related Art

The pressure measuring materials (that is, the materials used for measuring pressure) are used for a step of bonding liquid crystal glass, printing solder on a printed circuit board, adjusting pressure between rollers, and the like. Examples of the materials for measuring pressure include a pressure measuring film represented by PRESCALE (trade name; registered trademark) offered by FUJIFILM Corporation.

Various pressure measuring materials for measuring minute pressure have been studied.

For example, in order to obtain a visible or readable density at a minute pressure, JP2009-019949A proposes a pressure measuring material in which a difference ΔD of density of color developed before and after the application of pressure of 0.05 MPa is 0.02 or more.

SUMMARY OF THE INVENTION

As seen in JP2009-019949A described above, various pressure measuring materials for measuring minute pressure have been studied. Meanwhile, in various manufacturing processes, for the purpose of controlling a compression process or the like, a pressure measuring material for measuring a pressure in a high pressure range (preferably a range of 100 MPa to 10,000 MPa) is in demand.

However, because the upper limit of the pressure range that can be measured with the pressure measuring films on the market, that is, the upper limit of the pressure range in which color development can be obtained by the application of pressure is substantially about 300 MPa, the pressure measuring materials of the related art cannot be used for measuring pressure, particularly, a pressure higher than 300 MPa.

As described above, the measurement of pressure in a high pressure range is in demand, and such a demand is met to some extend with the pressure measuring materials of the related art. However, a further improvement of the materials is desired.

An object of an embodiment of the present disclosure is to provide a pressure measuring material from which color development with excellent gradation can be obtained in a high pressure range (preferably in a range of 100 MPa to 10,000 MPa).

The present disclosure includes the following aspects.

<1> A pressure measuring material having a substrate and a pressure-sensitive layer, in which the pressure-sensitive layer contains a polymer matrix containing a polymer compound having a molecular weight of 1,000 or more, microcapsules encapsulating an electron-donating dye precursor and a solvent, and an electron-accepting compound.

<2> The pressure measuring material described in <1>, which is in the form of a sheet.

<3> The pressure measuring material described in <1> or <2>, in which an arithmetic mean roughness Ra of an outermost surface opposite to the substrate is 10.0 μm or less.

<4> The pressure measuring 014201 material described in any one of <1> to <3>, in which the microcapsules and the electron-accepting compound are contained in the polymer matrix.

<5> The pressure measuring material described in <4>, in which an arithmetic mean roughness Ra of an outermost surface opposite to the substrate is less than 2.0 μm.

<6> The pressure measuring material described in <4> or <5>, in which the electron-accepting compound includes a metal salt of salicylic acid.

<7> The pressure measuring material described in any one of <4> to <6>, in which a void volume is 5 mL/m$^2$ or less.

<8> The pressure measuring material described in any one of <4> to <7>, in which a content of the microcapsules is 10% by volume to 80% by volume with respect to the pressure-sensitive layer.

<9> The pressure measuring material described in <3>, in which the pressure-sensitive layer has a color development-inducing layer having the electron-accepting compound and the polymer matrix and a color-developing layer having the microcapsules, the substrate, the color development-inducing layer, and the color-developing layer are provided in this order, and a thickness of the color-developing layer is equal to or less than ½ of a thickness of the color development-inducing layer.

<10> The pressure measuring material described in <9>, in which the arithmetic mean roughness Ra of the outermost surface opposite to the substrate is 2.0 to 10.0 μm.

<11> The pressure measuring material described in <9> or <10>, in which the electron-accepting compound includes acidic clay or activated clay.

<12> The pressure measuring material described in <11>, in which the pressure-sensitive layer has inorganic particles other than the electron-accepting compound.

<13> The pressure measuring material described in any one of <9> to <12>, in which a void volume is 5 mL/m$^2$ to 20 mL/m$^2$.

<14> The pressure measuring material described in any one of <1> to <13>, in which in a case where T represents a thickness of a layer calculated by subtracting a thickness of the substrate from a thickness of the pressure measuring material, and p represents an inner diameter of the microcapsules, a ratio T/p is 1.2 or more.

<15> The pressure measuring material described in <14>, in which in a case where T represents the thickness of a layer calculated by subtracting a thickness of the substrate from a thickness of the pressure measuring material, and p represents the inner diameter of the microcapsules, the ratio T/p is 1.2 to 5.0.

<16> The pressure measuring material described in any one of <1> to <15>, in which a content of the polymer compound having a molecular weight of 1,000 or more is 10% by mass or more with respect to a total mass of the pressure-sensitive layer.

<17> The pressure measuring material described in any one of <1> to <16>, in which the substrate is a polyethylene terephthalate substrate or a polyethylene naphthalate substrate.

<18> The pressure measuring material described in any one of <1> to <17>, further having an easy adhesion layer between the substrate and the pressure-sensitive layer.

<19> The pressure measuring material described in any one of <1> to <18>, in which a wall material of the microcapsules includes at least one kind of material selected from polyurethane urea or polyurethane.

<20> A method for manufacturing the pressure measuring material described in any one of <4> to <8> and <14> to <19>, having a step of disposing a pressure-sensitive layer-forming composition on the substrate, in which the pressure-sensitive layer-forming composition contains a polymer matrix containing a polymer compound having a molecular weight of 1,000 or more, microcapsules encapsulating an electron-donating dye precursor and a solvent, and an electron-accepting compound.

<21> A method for manufacturing the pressure measuring material described in any one of <9> to <19>, having a step of obtaining a color-developing layer-forming composition containing a solvent and microcapsules encapsulating an electron-donating dye precursor and a solvent, a step of obtaining a color development-inducing layer-forming composition containing an electron-accepting compound and a polymer compound having a molecular weight of 1,000 or more, a step of disposing the color development-inducing layer-forming composition on the substrate so as to form a color development-inducing layer, and a step of disposing the color-developing layer-forming composition on the color development-inducing layer so as to form a color-developing layer.

According to an embodiment of the present disclosure, it is possible to provide a pressure measuring material from which color development with excellent gradation can be obtained in a high pressure range (preferably in a range of 100 MPa to 10,000 MPa).

DESCRIPTION OF THE PREFERRED EMBODIMENTS

Figure 1:
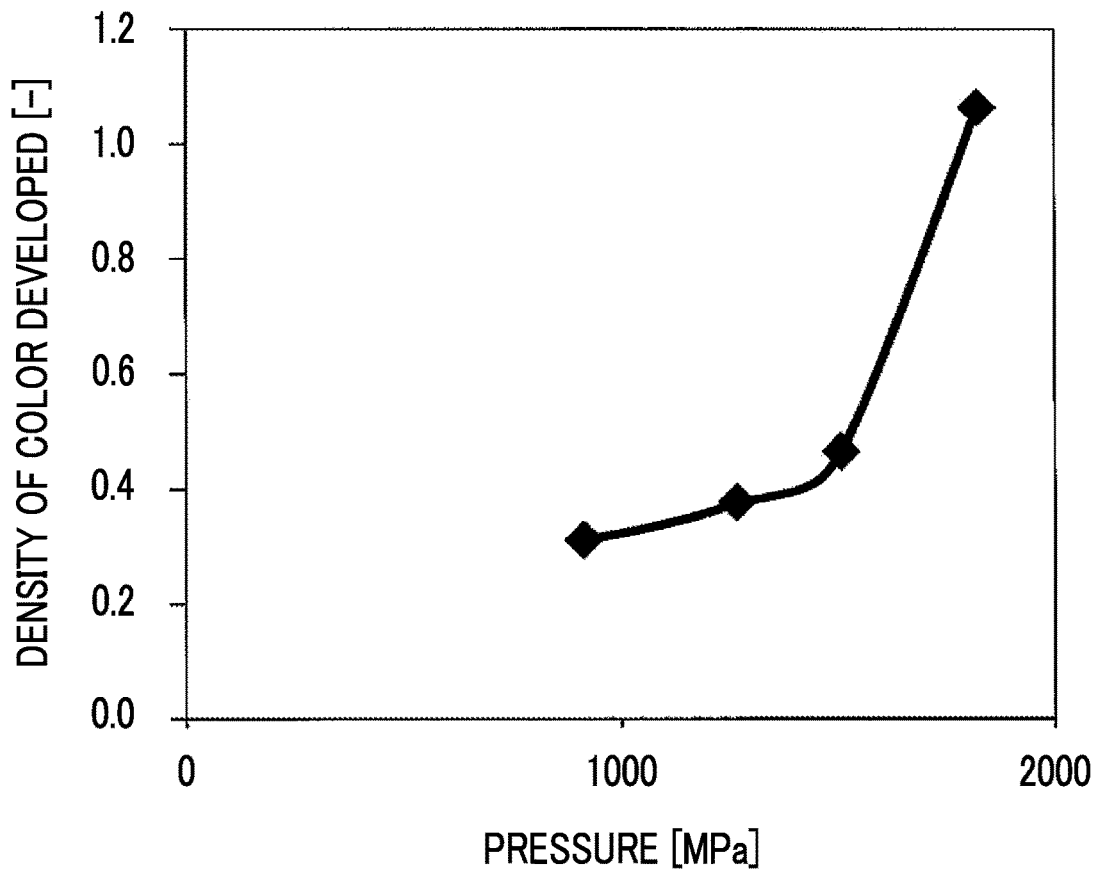
FIG. 1 is a graph showing the relationship between pressure and density of color developed in the evaluation of color development characteristics in Examples.

Hereinafter, the pressure measuring material of the present disclosure and a manufacturing method thereof will be specifically described. The pressure measuring material of the present disclosure and the manufacturing method thereof are not limited to the following embodiments, and can be embodied by being appropriated modified within the scope of the object of the present disclosure.

In the present disclosure, a range of numerical values described using "to" means a range including the numerical values listed before and after "to" as the lower limit and the upper limit.

Regarding the ranges of numerical values described in stages in the present disclosure, the upper or lower limit of a range of numerical values may be replaced with the upper or lower limit of another range of numerical values described in stages. Furthermore, regarding the ranges of numerical values described in the present disclosure, the upper or lower limit of a range of numerical values may be replaced with values described in examples.

In the present disclosure, in a case where there is a plurality of substances in a composition that corresponds to each component of the composition, unless otherwise specified, the amount of each component of the composition means the total amount of the plurality of substances present in the composition.

In the present disclosure, the combination of two or more preferred aspects is a more preferred aspect.

In the present disclosure, an electron-donating dye precursor is also called "color-developing agent", and an electron-accepting compound that causes the electron-donating dye precursor to develop color is also called "developer".

<Pressure Measuring Material and Manufacturing Method Thereof>

The pressure measuring material of the present disclosure has a substrate and a pressure-sensitive layer which contains a polymer matrix containing a polymer compound having a molecular weight of 1,000 or more (hereinafter, also simply called "polymer matrix"), microcapsules encapsulating an electron-donating dye precursor and a solvent, and an electron-accepting compound. If necessary, the pressure measuring material of the present disclosure may have other layers (for example, a white layer, a protective layer, an easy adhesion layer, and the like) in addition to the substrate and the pressure-sensitive layer.

In the related art, pressure measuring materials have been proposed and widely used. However, the pressure measuring materials of the related art have focused on being able to produce visible or readable density even by the application of minute pressure. For example, the pressure measuring material described in JP2009-019949A is for measuring minute pressure of less than 0.1 MPa.

In a case where the pressure measuring material is to be used for measuring minute pressure, a broad density gradation can be obtained from the material by certain effective methods (for example, the control of particle diameter, wall thickness, and constituent materials of microcapsules, and the like). However, in a case where the material is to be used for measuring pressure in a high pressure range, simply with such methods, sometimes it is difficult to design the material so as to obtain a broad density gradation.

As a solution to the above problem, the present disclosure provides a pressure measuring material having a substrate and a pressure-sensitive layer which contains a polymer matrix, microcapsules encapsulating an electron-donating dye precursor and a solvent, and an electron-accepting compound.

From this pressure measuring material of the present disclosure, color development with excellent gradation is obtained in a high pressure range (preferably a range of 100 MPa to 10,000 MPa, and more preferably in a range of 300 MPa to 3,000 MPa).

The reason why the pressure measuring material of the present disclosure brings about the above effect is unclear, but is assumed to be as below according to the inventors of the present invention. Because the pressure-sensitive layer contains a polymer matrix, microcapsules encapsulating an electron-donating dye precursor and a solvent, and an electron-accepting compound, even though a high pressure is applied, the pressure applied to the microcapsules may be relaxed, which may make it possible to measure pressure with excellent gradation of color development. However, the effects of the pressure measuring material of the present disclosure are not limited to this assumption.

In the present disclosure, "gradation of color development" means the properties in which the density of color developed increases as the pressure applied to the pressure measuring material increases.

The pressure measuring material of the present disclosure performs color development by the contact between the electron-donating dye precursor encapsulated in the microcapsules and the electron-accepting compound as a developer in the pressure-sensitive layer. This color development exhibits the density corresponding to the magnitude of the external force applied to the pressure measuring material (pressure applied from the outside, the same applies hereinafter), that is, the gradation of color development. For example, in a case where surface pressure is applied to the pressure measuring material, if the applied surface pressure is unevenly distributed throughout the surface, the material develops color at a density corresponding to the pressure, and an image having density gradation is obtained.

From the pressure measuring material of the present disclosure, gradation of color development can be obtained in a range of 100 MPa to 10,000 MPa. In a case where a pressure less than 100 MPa and/or a pressure higher than 10,000 MPa is applied to this material, gradation of color development may also be obtained.

[Substrate]

The pressure measuring material of the present disclosure has a substrate.

The substrate may be in any shape such as a sheet shape and a plate shape. The substrate is preferably in the shape of sheet. That is, the pressure measuring material of the present disclosure is preferably a sheet-shaped pressure measuring material having a sheet-shaped substrate and a pressure-sensitive layer. In the present disclosure, "sheet-shaped" means having two main surfaces, having a thickness of 1 mm or less (preferably 1 μm to 1 mm), and having flexibility. In the present disclosure, "sheet-shaped" includes "film-shaped", and these are used as terms having the same definition. "Plate-shaped" means having two main surfaces and having a thickness more than 1 mm (preferably more than 1 mm and 10 mm or less).

The substrate is not particularly limited. Specific examples thereof include paper, synthetic paper, a plastic substrate, a metal substrate, and the like. The substrate may be a composite substrate consisting of these. From the viewpoint of ease of handling, the substrate is preferably a plastic substrate.

Specific examples of paper include high-quality paper, medium-quality paper, woody paper, alkaline paper, acidic paper, recycled paper, coated paper, machine-coated paper, art paper, cast-coated paper, lightly coated paper, tracing paper, and the like.

Specific examples of plastic forming the plastic substrate include polyesters such as polyethylene terephthalate (PET) and polyethylene naphthalate (PEN), cellulose derivatives such as cellulose triacetate, polyolefins such as polypropylene and polyethylene, polystyrene, and the like.

Specific examples of synthetic paper include synthetic paper (such as YUPO) obtained by biaxially stretching polypropylene or polyethylene terephthalate so as to form many microvoids, synthetic paper prepared using synthetic fiber such as polyethylene fiber, polypropylene fiber, polyethylene terephthalate fiber, and polyamide fiber, a laminate obtained by laminating these on a part, one surface, or both surfaces of another synthetic paper, and the like.

The substrate is also preferably a substrate containing a metal. Examples of the substrate of this aspect include a metal substrate, a composite substrate consisting of a metal and plastic, and the like.

The metal is not particularly limited, but is preferably stainless steel (SUS) or the like, because such a metal is not easily deformed by the measurement pressure.

As the plastic substrate, a polyethylene terephthalate substrate or a polyethylene naphthalate substrate is preferable, because such a substrate can have a high hardness and a high planarity and makes it possible to measure better pressure in a high pressure range and to obtain better density of color developed.

From the viewpoint of reproducibility of density of color developed corresponding to pressure, a substrate is preferable which is less deformed by the application of pressure, does not affect a measurement object, and can suppress pressure dispersion that causes deterioration of measurement accuracy. As such a substrate, for example, a polyethylene naphthalate substrate or a substrate containing a metal is suitable.

Furthermore, it is also preferable to use a white substrate because this substrate can further improve visibility by increasing contrast between a color-developing portion and a non-color-developing portion. As the white substrate, a plastic substrate is preferable, and a white polyethylene terephthalate substrate is more preferable. As the white polyethylene terephthalate substrate, a substrate obtained by incorporating a known white coloring material (for example, a white pigment or the like) into a polyethylene terephthalate substrate may be used.

The thickness of the substrate is not particularly limited, but is preferably 10 μm to 500 μm and more preferably 10 μm to 200 μm, because a substrate having this thickness is easy to handle and can be supplied in the form of a roll.

[Pressure-Sensitive Layer]

The pressure measuring material of the present disclosure has a pressure-sensitive layer on the substrate.

The pressure-sensitive layer is a layer containing a polymer matrix, microcapsules encapsulating an electron-donating dye precursor and a solvent, and an electron-accepting compound.

(Polymer Matrix)

In the present disclosure, the term "polymer matrix" is used as a term for a matrix which is a constituent of the pressure-sensitive layer and is formed of a polymer compound having a molecular weight of 1,000 or more (hereinafter, also called a specific polymer compound).

The specific polymer compound preferably functions as a binder in the pressure-sensitive layer. The compounds constituting the microcapsules (including the inclusion of the microcapsules, the wall material, and the dispersant used for forming the microcapsules) and the electron-accepting compound are not included in the specific polymer compound.

In a case where the pressure-sensitive layer contains the specific polymer compound, the polymer matrix is confirmed to be a constituent of the pressure-sensitive layer according to the pressure measuring material of the present disclosure.

In view of further improving the gradation in a high pressure range, the content of a specific polymer compound with respect to the total mass of the pressure-sensitive layer is preferably 10% by mass or more, and more preferably 20% by mass or more. In a case where the amount of the specific polymer compound is 10% by mass or more, the external force (pressure) applied to the pressure measuring material is relaxed. As a result, the pressure-sensitive layer can easily retain components such as the microcapsules and the electron-accepting compound.

From the viewpoint of density of color developed, the content of the specific polymer compound forming the polymer matrix with respect to the total mass of the pressure-sensitive layer is preferably 10% by mass to 70% by mass, and more preferably 20% by mass to 50% by mass.

The specific polymer compound is not particularly limited, and can be appropriately selected depending on the properties required for the pressure-sensitive layer that is not easily deformed by the measurement pressure.

One kind of specific polymer compound may be used alone, or two or more kinds of specific polymer compounds may be used in combination.

Examples of the specific polymer compound include polyvinyl alcohol, a urethane-based polymer including polyurethane, a vinyl chloride-based polymer, a vinyl acetate-based polymer, an acrylic polymer, styrene-butadiene rubber (SBR), and a copolymer of these.

The urethane-based polymer means a polymer containing a constitutional unit having a urethane bond. The vinyl chloride-based polymer means a polymer containing a constitutional unit derived from vinyl chloride. The vinyl acetate-based polymer means a polymer containing a constitutional unit derived from vinyl acetate. The acrylic polymer means a polymer containing a constitutional unit derived from (meth)acrylic acid.

The specific polymer compound may be incorporated into the pressure-sensitive layer in the form of a dispersion.

From the viewpoint of applicability in preparing microcapsules and productivity in aqueous coating, polyvinyl alcohol is one of the suitable aspects of the specific polymer compound.

The polyvinyl alcohol is not particularly limited and may be appropriately selected depending on the properties required for the pressure-sensitive layer.

In view of further improving the gradation in a high pressure range by retaining the microcapsules and the like, the degree of polymerization of the polyvinyl alcohol is preferably 100 to 10,000, and more preferably 100 to 3,000.

In view of further improving the gradation in a high pressure range by retaining the microcapsules and the like, the molecular weight of the specific polymer compound is 1,000 or more, preferably 2,000 or more, more preferably 5,000 or more, and even more preferably 10,000 or more. The upper limit of the molecular weight is not particularly limited, and may be 1,000,000 for example. From the viewpoint of ease of manufacturing, the molecular weight is preferably 2,000 to 100,000, more preferably 5,000 to 100,000, and even more preferably 10,000 to 100,000. The molecular weight of the specific polymer compound represents a number-average molecular weight measured by gel permeation chromatography (GPC).

Specifically, the aforementioned molecular weight is a molecular weight detected using a gel permeation chromatography (GPC) analyzer using TSKgel GMHxL, TSKgel G4000HxL, and TSKgel G2000HxL columns (trade names, manufactured by TOSOH CORPORATION), tetrahydrofuran (THF) as a solvent, and a differential refractometer, and expressed in terms of polystyrene as a standard substance.

As the specific polymer compound, commercially available products can also be used. Examples of the commercially available products include PVA-105 (polyvinyl alcohol) and PVA-205 (polyvinyl alcohol) manufactured by KURARAY CO., LTD.; SUPERFLEX 170 (urethane-based polymer), SUPERFLEX 820 (urethane-based polymer), SUPERFLEX 830HS (urethane-based polymer), and SUPERFLEX 870 (urethane-based polymer) manufactured by DKS Co., Ltd.; Vinyblan 287 (vinyl chloride·acrylic polymer), Vinyblan 900 (vinyl chloride·acrylic polymer), Vinyblan 2684 (acrylic polymer), Vinyblan 2685 (acrylic polymer), Vinyblan 2687 (acrylic polymer), and Vinyblan 715S (vinyl chloride polymer) manufactured by Nissin Chemical Co., Ltd.; SUMIKAFLEX 752HQ (ethylene-vinyl acetate copolymer resin emulsion), SUMIKAFLEX 808HQ (ethylene-vinyl acetate-vinyl chloride copolymer resin emulsion), SUMIKAFLEX 850HQ (ethylene-vinyl acetate-vinyl chloride copolymer resin emulsion), and SUMIKAFLEX 830 (ethylene-vinyl acetate-vinyl chloride copolymer resin emulsion) manufactured by Sumika Chemtex Co., Ltd.; Nipol LX433C (styrene butadiene rubber), Nipol LX2507H (styrene butadiene rubber), Nipol LX416 (styrene butadiene rubber), Nipol LX814 (acrylic polymer), and Nipol LX855EX1 (acrylic polymer) manufactured by ZEON CORPORATION; MOVINYL 742A (acrylic polymer), MOVINYL 1711 (acrylic polymer), MOVINYL 6520 (acrylic polymer), MOVINYL 7980 (acrylic polymer), MOVINYL 081F (vinyl acetate-ethylene-based copolymer), and MOVINYL 082 (vinyl acetate-ethylene-based copolymer) manufactured by The Nippon Synthetic Chemical Industry Co., Ltd.; SMARTEX SN-307R (styrene butadiene latex) manufactured by NIPPON A&L INC., and the like.

Martens hardness is an example of physical properties suitable as an index of the specific polymer compound forming the polymer matrix.

From the viewpoint of accomplishing both the pressure measurement and density of color developed in a high pressure range (preferably 100 MPa to 10,000 MPa, and more preferably 300 MPa to 3,000 MPa), the polymer matrix according to the present disclosure preferably contains a polymer compound having a Martens hardness of 100 $N/mm^2$ or more.

It is preferable that the polymer matrix contain a polymer compound having a Martens hardness of 100 $N/mm^2$ or more, because then the deformation of the pressure-sensitive layer is suppressed even though the pressure-sensitive layer is used for measuring pressure in a high pressure range, and more accurate gradation of color development is obtained.

The Martens hardness of the polymer compound is more preferably 140 $N/mm^2$ or more.

The upper limit of the Martens hardness of the polymer compound is not particularly limited, and can be 300 $N/mm^2$ or less.

The Martens hardness can be determined using the nanoindentation method based on ISO 14577-1 (instrumented indentation hardness), as a value obtained by dividing the maximum test load by the surface area of an indenter at the maximum indentation depth of the indenter. The Martens hardness can be measured, for example, using a microhardness tester such as "HM2000" manufactured by FISCHER instruments.

The specific measurement method will be shown in Examples that will be described later.

(Microcapsules)

The pressure-sensitive layer contains microcapsules encapsulating an electron-donating dye precursor and a solvent.

Usually, each of the microcapsules has a core portion and a capsule wall for encapsulating core materials (materials to be encapsulated (also called inclusion components or inclusions)) forming the core portion.

The microcapsules each encapsulate an electron-donating dye precursor and a solvent as core materials (inclusion components). Being encapsulated in the microcapsules, the electron-donating dye precursor can stably exist until the microcapsules are disrupted by pressure.

Wall Material of Microcapsule

As the wall material of the microcapsules, water-soluble or oil-soluble polymers that have been used in the related art as wall materials of microcapsules containing electron-donating dye precursors of pressure-sensitive recording materials can be used without particular limitations. As the wall material, among these, polyurethane urea, polyurethane, polyurea, a melamine formaldehyde resin, and gelatin are preferable, polyurethane urea, polyurethane, polyurea, and a melamine formaldehyde resin are more preferable from the viewpoint of obtaining excellent color development, and polyurethane urea and polyurethane having a urethane bond are particularly preferable.

It is preferred that the capsule wall of the microcapsules is substantially composed of a resin. "Substantially composed of a resin" means that the content of the resin is 90% by mass or more with respect to the total mass of the capsule wall. The content of the resin is preferably 100% by mass. That is, the capsule wall of the microcapsules is preferably composed of a resin.

Polyurethane is a polymer having a plurality of urethane bonds, and is preferably a reaction product generated from a raw material including a polyol and a polyisocyanate.

Polyurea is a polymer having a plurality of urea bonds, and is preferably a reaction product generated from a raw material including a polyamine and a polyisocyanate. A part of the polyisocyanate reacts with water and turns into polyamine. By using this properties, it is also possible to synthesize polyurea by using polyisocyanate without using a polyamine.

Polyurethane urea is a polymer having a urethane bond and a urea bond, and is preferably a reaction product generated from a raw material including a polyol, a polyamine, and a polyisocyanate. During the reaction between a polyol and a polyisocyanate, sometimes a part of the polyisocyanate reacts with water and turns into a polyamine, and polyurethane urea is consequently obtained.

The melamine formaldehyde resin is preferably a reaction product generated by the polycondensation of melamine and formaldehyde.

The aforementioned polyisocyanate is a compound having 2 or more isocyanate groups. Examples thereof include an aromatic polyisocyanate and an aliphatic polyisocyanate. For example, the polyisocyanate may be an adduct of a polyol such as trimethylolpropane and a difunctional polyisocyanate.

The aforementioned polyol is a compound having 2 or more hydroxyl groups. Examples thereof include a low-molecular-weight polyol (such as an aliphatic polyol or an aromatic polyol. "low-molecular-weight polyol" refers to a polyol having a molecular weight of 400 or less), polyvinyl alcohol, a polyether-based polyol, a polyester-based polyol, a polylactone-based polyol, a castor oil-based polyol, a polyolefin-based polyol, a hydroxyl group-containing amine-based compound (examples thereof include an amino alcohol, examples of the amino alcohol include N,N,N',N'-tetrakis(2-hydroxypropyl)ethylenediamine which is a propylene oxide or ethylene oxide adduct of an amino compound such as ethylenediamine) and the like.

The aforementioned polyamine is a compound having 2 or more amino groups (primary amino groups or secondary amino groups). Examples thereof include an aliphatic polyvalent amine such as diethylenetriamine, triethylenetetramine, 1,3-propylenediamine, and hexamethylenediamine; an epoxy compound adduct of an aliphatic polyvalent amine; an alicyclic polyvalent amine such as piperazine; and a heterocyclic diamine such as 3,9-bis-aminopropyl-2,4,8, 10-tetraoxaspiro-(5,5)undecane.

A number-average wall thickness $\delta$ of the microcapsules depends on various conditions such as the type of capsule wall material and the capsule diameter. From the viewpoint color developability in a high pressure range (preferably 100 MPa to 10,000 MPa, and more preferably 300 MPa to 3,000 MPa), the number-average wall thickness $\delta$ is preferably 0.02 μm to 3 μm, and more preferably 0.05 μm to 2 μm.

The wall thickness of the microcapsules refers to the thickness (μm) of a resin film (so-called capsule wall) forming the capsule particles of the microcapsules. The number-average wall thickness refers to a value obtained by measuring the thickness (μm) of capsule wall of 5 microcapsules by using a scanning electron microscope (SEM) and calculating the average thereof. Specifically, first, a certain support is coated with a microcapsule solution and dried so that a coating film is formed. From the obtained coating film, a cross-sectional slice is prepared, the cross section is observed using SEM, and 5 microcapsules are randomly selected. By observing the cross section of the selected microcapsules, the thickness of the capsule wall is determined, and the average thereof is calculated. The cross-sectional slice can also be prepared from the pressure measuring material.

Electron-Donating Dye Precursor

The electron-donating dye precursor is not particularly limited as long as it is a substance that develops color by donating electrons or accepting protons of acids (hydrogen ions; $H^+$). The electron-donating dye precursor is preferably colorless. The electron-donating dye precursor can function as a color-developing agent.

Particularly, as the electron-donating dye precursor, a colorless compound is preferable which has a partial skeleton such as lactone, lactam, sultone, spiropyrane, ester, or amide that undergoes ring opening or cleavage in a case where the electron-donating dye precursor comes into contact with the electron-accepting compound which will be described later.

As the electron-donating dye precursor, it is possible to use known compounds used for pressure-sensitive copying paper or thermal recording paper. Examples of the electron-donating dye precursor include various compounds such as a triphenylmethanephthalide-based compound, a fluoran-based compound, a phenothiazine-based compound, an indolylphthalide-based compound, a leukoauramine-based compound, a rhodamine lactam-based compound, a triphenylmethane-based compound, a diphenylmethane-based compound, a triazene-based compound, a spiropyran-based compound, and a fluorene-based compound.

For details of the above compounds, JP1993-257272A (JP-H05-257272A) and paragraphs "0029" to "0034" in WO2009/008248A can be referred to.

One kind of electron-donating dye precursor may be used alone, or two or more kinds of electron-donating dye precursors may be used in combination.

In an aspect of the present disclosure, from the viewpoint of visibility, the electron-donating dye precursor preferably has a high molar light absorption coefficient (ε). The molar light absorption coefficient (ε) of the electron-donating dye precursor is preferably 10,000 mol$^{-1}$·cm$^{-1}$·L or more, more preferably 15,000 mol$^{-1}$·cm$^{-1}$·L or more, and even more preferably 25,000 mol$^{-1}$·cm$^{-1}$·L or more.

The molar light absorption coefficient (ε) can be calculated from the absorbance obtained in a case where an electron-donating colorless dye is dissolved in a 95% by mass aqueous acetic acid solution. Specifically, by using a 95% by mass aqueous acetic acid solution of an electron-donating colorless dye having a concentration adjusted to obtain an absorbance of 1.0 or less, the molar light absorption coefficient (ε) can be calculated by the following equation in which A (cm) represents the length of a measurement cell, B (mol/L) represents the concentration of the electron-donating colorless dye, and C represents the absorbance.

$$\text{Molar light absorption coefficient}(\varepsilon) = C/(A \times B)$$

From the viewpoint of improving color developability in a pressure range which is preferably 100 MPa to 10,000 MPa (more preferably 300 MPa to 3,000 MPa), the content (for example, coating amount) of the electron-donating dye precursor in the pressure-sensitive layer that is expressed as mass after drying is preferably 0.1 g/m$^2$ to 5 g/m$^2$, more preferably 0.1 g/m$^2$ to 4 g/m$^2$, and even more preferably 0.2 g/m$^2$ to 3 g/m$^2$.

Solvent

The microcapsules encapsulate at least one kind of solvent. The solvent can function as an oil component that dissolves the electron-donating dye precursor.

As the solvent, it is possible to use known solvents used for pressure-sensitive copying paper.

In the solvent, in view of stably dissolving the electron-donating dye precursor without forming precipitates, the content of a solvent having a boiling point higher than 130° C. is preferably 50% by mass to 100% by mass, more preferably 70% by mass to 100% by mass, and even more preferably 90% by mass to 100% by mass. The upper limit of the boiling point is not particularly limited, and may be 500° C. for example. The upper limit of the boiling point is preferably higher than 130° C. and 500° C. or lower.

Examples of the solvent include an alkylnaphthalene compound such as diisopropyl naphthalene; a diarylalkane-based compound such as 1-phenyl-1-xylyl ethane; an alkyl-biphenyl-based compound such as isopropyl biphenyl; a triaryl methane-based compound; an alkylbenzene-based compound; a benzyl naphthalene-based compound; a diaryl alkylene-based compound; an aromatic hydrocarbon such as aryl indane-based compound; an ester-based compound such as dibutyl phthalate; an aliphatic hydrocarbon such as isoparaffin; natural animal and vegetable oils such as soybean oil, corn oil, cottonseed oil, rapeseed oil, olive oil, palm oil, castor oil, and fish oil; high boiling point fractions of natural substances such as mineral oil; and the like.

One kind of solvent may be used alone, or two or more kinds of solvents may be used by being mixed together.

In view of color developability, the mass ratio of the solvent to the electron-donating dye precursor encapsulated in the microcapsules (solvent:precursor) is preferably in a range of 98:2 to 30:70, more preferably in a range of 97:3 to 40:60, and even more preferably in a range of 95:5 to 50:50.

Other Components

If necessary, the microcapsules may encapsulate additives, in addition to the electron-donating dye precursor, solvent, and auxiliary solvent descried above. Examples of the additives include an ultraviolet absorber, a light stabilizer, an antioxidant, wax, an odor suppressant, and the like. Furthermore, the microcapsules may encapsulate a solvent having a boiling point of 130° C. or lower (for example, a ketone-based compound such as methyl ethyl ketone, an ester-based compound such as ethyl acetate, or an alcohol-based compound such as isopropyl alcohol) that is used for manufacturing the microcapsules.

In the pressure-sensitive layer, the content of the microcapsules (coating amount in a case where the microcapsules are provided by coating) with respect to the total mass of solid contents of the pressure-sensitive layer is preferably 10% by mass to 80% by mass, more preferably 10% by mass to 60% by mass, and even more preferably 10% by mass to 50% by mass.

Method for Preparing Microcapsules

The microcapsules can be manufactured by any of known methods such as interfacial polymerization, internal polymerization, phase separation, external polymerization, and coacervation.

For preparing microcapsules by using polyurethane urea, polyurethane, and polyurea as a capsule wall material, for example, paragraphs "0040" to "0044" of JP2009-019949A can be referred to. Specifically, the microcapsules can be formed, for example, by a method of mixing a compound for forming a wall material of the microcapsules with a core material of the microcapsules, and reacting the compound for forming a wall material of the microcapsules. In forming the microcapsules, it is preferable to use a dispersant such as polyvinyl alcohol.

(Electron-Accepting Compound)

The pressure-sensitive layer contains at least one kind of electron-accepting compound. The electron-accepting compound can function as a developer.

Examples of the electron-accepting compound include an inorganic compound and an organic compound.

Specific examples of the inorganic compound include acidic clay, activated clay, attapulgite, zeolite, bentonite, a clay substance such as kaolin, and the like.

Specific examples of the organic compound include a metal salt of an aromatic carboxylic acid (preferably a metal salt of salicylic acid), a phenol formaldehyde resin, a metal salt of a carboxylated terpene phenol resin, and the like.

Among these, acidic clay, activated clay, zeolite, kaolin, a metal salt of aromatic carboxylic acid, or a metal salt of a carboxylated terpene phenol resin is preferable as the electron-accepting compound, and acidic clay, activated clay, kaolin, or a metal salt of an aromatic carboxylic acid is more preferable.

Specifically, as the aromatic carboxylic acid in the metal salt of aromatic carboxylic acid, for example, 3,5-di-t-butylsalicylic acid, 3,5-di-t-octylsalicylic acid, 3,5-di-t-nonylsalicylic acid, 3,5-di-t-dodecylsalicylic acid, 3-methyl-5-t-dodecylsalicylic acid, 3-t-dodecylsalicylic acid, 5-t-dodecylsalicylic acid, 5-cyclohexylsalicylic acid, 3,5-bis(α,α-dimethylbenzyl)salicylic acid, 3-methyl-5-(α-methylbenzyl)salicylic acid, 3-(α,α-dimethylbenzyl)-5-methylsalicylic acid, 3-(α,α-dimethylbenzyl)-6-methylsalicylic acid, 3-(α-methylbenzyl)-5-(α,α-dimethylbenzyl)salicylic acid, 3-(α,α-dimethylbenzyl)-6-ethylsalicylic acid, and 3-phenyl-5-(α,α-dimethylbenzyl)salicylic acid are preferable. Furthermore, a carboxy-modified terpene phenol resin, a salicylic acid resin which is a reaction product of 3,5-bis(α-methylbenzyl)salicylic acid and benzyl chloride, and the like can also be used as the aromatic carboxylic acid. Specific examples of the metal salt in the metal salt of an aromatic carboxylic acid include a zinc salt, a nickel salt, an aluminum salt, and a calcium salt.

The content of the electron-accepting compound in the pressure-sensitive layer (coating amount in a where the electron-accepting compound is provided by coating) that is expressed as dry mass is preferably 0.1 g/m² to 30 g/m². In a case where the electron-accepting compound is an inorganic compound, the content thereof expressed as dry mass is more preferably 3 g/m² to 20 g/m², and more preferably 5 g/m² to 15 g/m². In a case where the electron-accepting compound is an organic compound, the content thereof expressed as dry mass is more preferably 0.1 g/m² to 15 g/m², and even more preferably 0.2 g/m² to 10 g/m².

(Oil-Absorbing Particles)

The pressure-sensitive layer preferably contains at least one kind of oil-absorbing particles outside the microcapsules.

Because high pressure is applied to the pressure measuring material of the present disclosure, the solvent (oil component) encapsulated in the microcapsules tends to easily leach out of the pressure-sensitive layer. Leaking of the oil component is not desirable because it can cause oil stains. However, in a case where the pressure-sensitive layer contains oil-absorbing particles on the outside of the microcapsules, the leakage of the oil component out of the pressure-sensitive layer can be effectively suppressed.

In the present disclosure, "oil-absorbing particles" mean particles that absorb linseed oil at 25° C. until an oil absorption amount reaches 50% by mass or more of the weight of the particles.

The oil absorption amount is measured according to JIS-K5101-13-1: 2004.

Examples of the shape of the particles include a spherical shape, an elliptical shape, a rod shape, and the like. The particles may have other shapes.

The particle diameter of the oil-absorbing particles is preferably 0.5 µm to 20 µm, more preferably 1 µm to 10 µm, and even more preferably 2 µm to 8 µm.

The particle diameter of the oil-absorbing particles can be measured using Microtrac MT3300EXII (manufactured by NIKKISO CO., LTD.).

Examples of the oil-absorbing particles include inorganic particles such as porous silica particles, calcium carbonate, kaolin, aluminum silicate, calcium silicate, colloidal silica, alumina, and aluminum hydroxide, and polymer particles such as polyolefin, acryl, polystyrene, and polyester. Among these, at least one kind of inorganic particles selected from porous silica particles, calcium carbonate, or kaolin are preferable.

Among the electron-accepting compounds as developers, an oil-absorbing compound may be used as the oil-absorbing particles.

As the oil-absorbing particles, commercially available products may be used. Examples thereof include "BRILLIANT Series" manufactured by SHIRAISHI KOGYO KAISHA, LTD., and the like.

The content of the oil-absorbing particles in the pressure-sensitive layer can be appropriately set depending on the desired oil-absorbing properties.

(Inorganic Particles)

The pressure-sensitive layer preferably contains at least one kind of inorganic particles not being an electron-accepting compound outside the microcapsules.

Examples of the inorganic particles include porous silica particles, calcium carbonate, kaolin, aluminum silicate, calcium silicate, colloidal silica, alumina, aluminum hydroxide, and the like. Among these, silica is preferable. The inorganic particles may be inorganic particles as the oil-absorbing particles described above.

As the inorganic particles, commercially available products may be used. Examples thereof include "MIZUKASIL series" manufactured by MIZUSAWA INDUSTRIAL CHEMICALS, LTD., and the like.

The particle diameter of the inorganic particles is preferably 1 µm to 30 µm, and more preferably 5 µm to 20 µm.

(Other Components)

The pressure-sensitive layer may contain other components. Examples thereof include a surfactant, a fluorescent brightener, an antifoaming agent, a penetrant, an ultraviolet absorber, a preservative, and the like.

(Thickness t of Pressure-Sensitive Layer)

A thickness t of the pressure-sensitive layer is not particularly limited and can be selected depending on the purpose and the like.

The thickness t of the pressure-sensitive layer is preferably 1 µm to 250 µm, more preferably 3 µm to 200 µm, even more preferably 5 µm to 150 µm, and particularly preferably 5 µm to 50 µm.

In a case where the pressure-sensitive layer has a color-developing layer and a color development-inducing layer as in the second aspect which will be described later, the total thickness of the color-developing layer and the color development-inducing layer is regarded as the thickness of the pressure-sensitive layer.

The thickness t of the pressure-sensitive layer can be measured by microscopy.

Specifically, a pressure measuring material as a measurement object is vertically cut to prepare a cross-sectional slice, the cross-sectional slice is observed using a scanning electron microscope (SEM), and the thickness of the pressure-sensitive layer can be obtained from the image. Examples of the scanning electron microscope include a desktop microscope "Miniscope TM3030Plus" (manufactured by Hitachi High-Tech Corporation).

The thickness of the pressure-sensitive layer in the present disclosure is an arithmetic mean of thicknesses at 10 sites that are randomly selected.

The coefficient of variation (hereinafter, also called CV value) of the particle diameter distribution of all the particles contained in the pressure-sensitive layer is preferably 20% to 150%.

In a case where the CV value is within the above range, the particle distribution in the pressure-sensitive layer, particularly, the relative variation of the microcapsules is small. Therefore, excellent color developability is obtained.

The CV value is preferably 20% to 110%, and more preferably 25% to 80%.

The CV value represents the relative variation of the particles contained in the pressure-sensitive layer, which is a value calculated as below.

$$CV \text{ value}(\%)=\text{standard deviation/arithmetic mean particle diameter} \times 100$$

The arithmetic mean particle diameter and the standard deviation are values calculated by imaging the surface of the pressure-sensitive layer with an optical microscope at a 150× magnification, and measuring the size of all microcapsules in a 2 cm×2 cm area that is randomly set.

(Layer Constitution of Pressure-Sensitive Layer)

The pressure-sensitive layer of the present disclosure may be constituted with one layer or multiple layers.

In an aspect of the layer constitution of the pressure-sensitive layer, the pressure-sensitive layer can be constituted with a layer in which microcapsules and an electron-accepting compound are contained in a polymer matrix. The pressure-sensitive layer adopting this aspect will be specifically described with reference to the pressure-sensitive layer of the first aspect that will be described later as an example.

In another aspect of the pressure-sensitive layer of the present disclosure, the pressure-sensitive layer can have a color development-inducing layer having an electron-accepting compound and a polymer matrix and a color-developing layer having microcapsules. The pressure-sensitive layer adopting this aspect will be specifically described with reference to the pressure-sensitive layer of the second aspect that will be described later as an example.

<First Aspect>

The first aspect of the pressure-sensitive layer of the present disclosure is a pressure-sensitive layer in which microcapsules and an electron-accepting compound are contained in a polymer matrix.

The details of components (such as a specific polymer compound, microcapsules, and an electron-accepting compound) used in the pressure-sensitive layer according to the first aspect are the same as those described above, and the preferred aspects of the components are also the same as those described above.

In the present disclosure, the state where a certain component is "contained in a polymer matrix" means that at least a part of the component is contained in the pressure-sensitive layer, in a state of being in contact with the specific polymer compound. The component contained in the polymer matrix may be in a dispersed state or dissolved state. In a case where the component is a solid, a part thereof may be exposed on the surface of the pressure-sensitive layer.

Specifically, in a case where the component is microcapsules, a state where the entirety of the microcapsules is on the inside of the pressure-sensitive layer and a state where a part of the capsule wall of the microcapsules is exposed on the surface of the pressure-sensitive layer are both regarded as a state where the microcapsules in the present disclosure are contained in the polymer matrix. A state where the entirety of the microcapsules is in contact with the specific polymer compound includes both a state where the microcapsules each consisting of inclusions and a wall material are in direct contact with the specific polymer compound and a state where the microcapsules are in contact with the specific polymer compound via a dispersant.

An example of the pressure measuring material having the pressure-sensitive layer according to the first aspect will be described with reference to FIG. 2 as appropriate.

Figure 2:
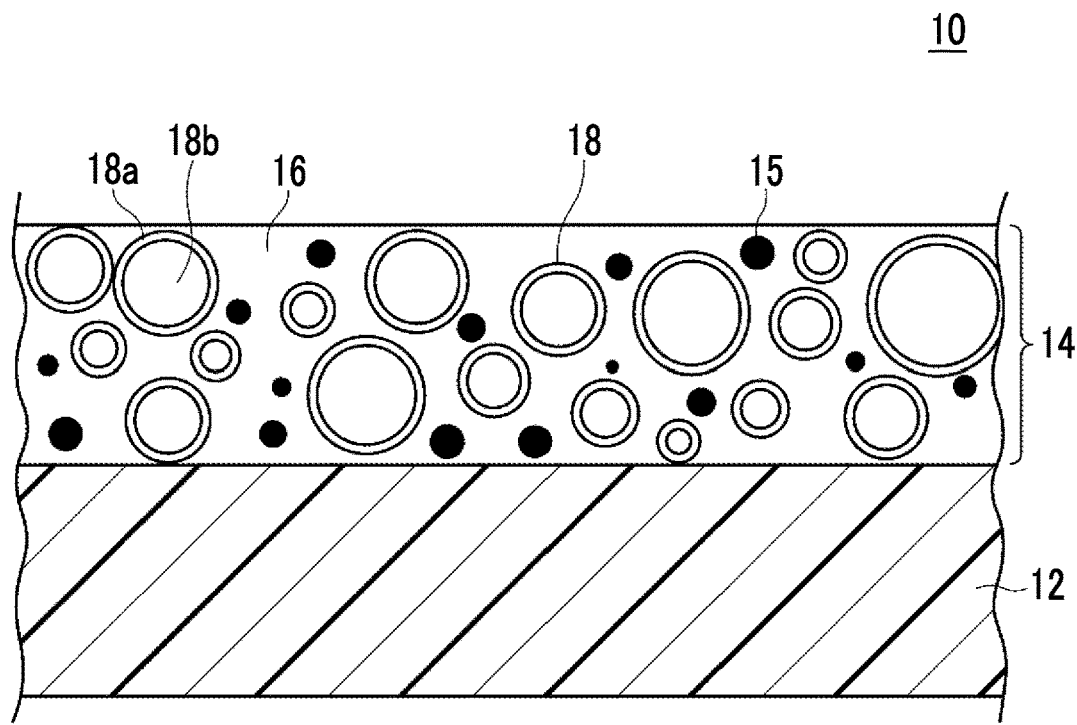
FIG. 2 is a schematic cross-sectional view showing an example of a pressure measuring material of the present disclosure.

FIG. 2 is a schematic cross-sectional view showing an example of the pressure measuring material having the pressure-sensitive layer according to the first aspect. Note that FIG. 2 is used to describe the first aspect, and the size and ratio of the constituents shown in the drawing are not the same as the actual ones.

In a pressure measuring material 10 shown in FIG. 2, a pressure-sensitive layer 14 is provided on a substrate 12. The pressure-sensitive layer 14 has microcapsules 18 and an electron-accepting compound 15. 18a represents a capsule wall of the microcapsules and 18b represents inclusions (that is, core materials) of the microcapsules. 16 represents a polymer matrix containing the specific polymer compound (not shown in the drawing).

The pressure measuring material having the pressure-sensitive layer according to the first aspect can be particularly preferably used in a pressure range of 500 MPa or more.

From the viewpoint of excellent gradation in a high pressure range of 500 MPa or higher, the arithmetic mean roughness Ra of the pressure measuring material according to the first aspect is preferably less than 2.0 µm. In other words, it is preferable that most of the microcapsules and the electron-accepting compound be located in the polymer matrix without being exposed on the surface of the pressure-sensitive layer.

In the present disclosure, the arithmetic mean roughness Ra of the pressure measuring material means the arithmetic mean roughness Ra specified in JIS B 0681-6: 2014. As a measurement device, a white light scanning interferometer using optical interferometry (specifically, New View5020 manufactured by Zygo: Stich mode; objective lens with a 50× magnification; intermediate lens with a 0.5× magnification) is used.

The arithmetic mean roughness Ra corresponds to the arithmetic mean roughness Ra of the surface opposite to the substrate side. The arithmetic mean roughness Ra of the pressure measuring material according to the first aspect is preferably 0 µm or more and less than 2.0 µm, more preferably 0 µm to 1.0 µm, and even more preferably 0 µm to 0.5 µm.

Examples of the method for obtaining the arithmetic mean roughness Ra of less than 2.0 µm include increasing the amount of the specific polymer compound in the pressure-sensitive layer, and the like. The amount of the specific polymer compound is preferably 20% by mass or more with respect to the total solid content constituting the pressure-sensitive layer.

From the viewpoint of excellent gradation in a high pressure range of 500 MPa or higher, the pressure measuring material having the pressure-sensitive layer according to the first aspect preferably has a void volume of 5 mL/m$^2$ or less. In a case where the void volume is low, the microcapsules easily endure pressure and are hardly disrupted until the applied pressure reaches 500 MPa or higher. The void volume is preferably 0 mL/m$^2$ to 5 mL/m$^2$, more preferably 0 mL/m$^2$ to 3 mL/m$^2$, and even more preferably 0 mL/m$^2$ to 1 mL/m$^2$.

The void volume is a value calculated by the following equation.

A mass ($m_1$) of the pressure measuring material cut in 10 cm×10 cm is measured. Then, the pressure measuring material is permeated with diethylene glycol from the surface provided with the pressure-sensitive layer, the diethylene glycol remaining on the surface is wiped off, and then a mass ($m_2$) is measured. Thereafter, $m_2-m_1$ is calculated to find X, and a void volume is calculated from the following equation. The density of the diethylene glycol is 1.118.

$$\text{Void volume}(m_1/m_2)=100X\div 1.118$$

In view of reducing the void volume, the electron-accepting compound contained in the pressure-sensitive layer of the first aspect preferably contains an organic compound, more preferably contains an organic compound as a main component, and even more preferably has an organic compound content of 50% by mass to 100% by mass. As the electron-accepting compound, for example, the compounds described above are preferable. The electron-accepting compound preferably includes a metal salt of an aromatic carboxylic acid, and particularly preferably includes a metal salt of salicylic acid. In the present specification, "containing a compound as a main component" means that the compound is a component of the highest content among electron-accepting compounds.

In view of further improving gradation in a high pressure range, the content (volume fraction) of the microcapsules with respect to the pressure-sensitive layer is preferably 10% by volume to 80% by volume, more preferably 20% by volume to 60% by volume, and even more preferably 30% by volume to 60% by volume.

The content (volume fraction) of the microcapsules with respect to the pressure-sensitive layer can be measured by the following method. The method will be described with reference to FIG. 2.

A cross-sectional slice of the pressure measuring material 10 is prepared, and the cross-section is observed with a scanning electron microscope (SEM) at a 1,000× magnification. In the SEM image of the cross section, the inside of microcapsules 18 (inclusion 18b) and a matrix portion including a capsule wall 18a, a polymer matrix 16 containing the specific polymer compound (not shown in the drawing), and the electron-accepting compound 15 are observed as parts distinguished from each other. For all the microcapsules 18 existing in the observed field of view, the inside of the microcapsules 18 (inclusion 18b) and the matrix portion including the capsule wall 18a, the polymer matrix 16 containing the specific polymer compound, and the electron-accepting compound 15 are separated by image analysis. The internal area of the microcapsules and the area of the matrix portion are calculated, and from the ratio thereof, a content A (% by area) of the inside of the microcapsules is calculated. Next, another cross-sectional slice is prepared which is cut in a direction orthogonal to the aforementioned cross-sectional slice and to the substrate, and a content B (% by area) of the microcapsules is calculated in the same manner as described above. The average of the content A (% by area) of the inside of the microcapsules and the content B (% by area) of the inside of the microcapsules is calculated. This operation is performed at two sites that are randomly selected, and the averages obtained at the two sites are averaged and adopted as the content (% by volume) of the microcapsules.

Particle Diameter $d_1$ of Microcapsules

In the first aspect, "particle diameter $d_1$ of microcapsules" means a volume-based median diameter.

In a case where all the microcapsules contained in the pressure-sensitive layer are divided into two groups based on a threshold value that is a particle diameter at which the cumulative volume is 50%, a diameter (D50) at which the total volume of particles in the large diameter group equals the total volume of particles in the small diameter group is the volume-based median diameter of the microcapsules.

The volume-based median diameter of the microcapsules is obtained by coating a support with a microcapsule solution, imaging the surface of a coating film formed after drying by using an optical microscope at a 150× magnification, measuring the size of all the microcapsules in a 2 cm×2 cm area, and calculating the volume-based median diameter.

From the viewpoint of color developability in a high pressure range (preferably 100 MPa to 10,000 MPa, and more preferably 300 MPa to 3,000 MPa), the particle diameter $d_1$ of the microcapsules is preferably 1 μm to 50 μm, and more preferably 5 μm to 30 μm.

From the viewpoint of measuring higher pressure and obtaining a higher density of color developed, the ratio of the thickness t of the pressure-sensitive layer to the particle diameter $d_1$ of the microcapsules contained in the pressure-sensitive layer preferably satisfies the relationship shown in Expression 1.

$$1 < t/d_1 < 5 \qquad \text{Expression 1}$$

In a case where $t/d_1 < 5$ is satisfied, better color developability can be obtained. In a case where $1 < t/d_1$ is satisfied, fogging can be easily suppressed.

Inner Diameter $p_1$ of Microcapsules

From the viewpoint of further improving gradation in a high pressure range and from the viewpoint of color developability in a high pressure range, an inner diameter $p_1$ of the microcapsule is preferably 0.5 μm to 50 μm, more preferably 1 μm to 30 μm, and even more preferably 2 μm to 20 μm.

In the first aspect, "inner diameter $p_1$ of the microcapsules" is a value obtained by the following method. The method will be described with reference to FIG. 2.

A cross-sectional slice of the pressure measuring material 10 is prepared, and the cross-section is observed with a scanning electron microscope (SEM) at a 1,000× magnification. In the SEM image of the cross section, the inside of microcapsules 18 (inclusion 18b), a capsule wall 18a, and a matrix portion including a polymer matrix 16 containing the specific polymer compound and the electron-accepting compound 15 are observed as parts distinguished from each other. Among the microcapsules 18 existing in the observed field of view, the major axis (inner diameter) of 10 microcapsules is measured in order from the largest microcapsule, and an arithmetic mean thereof is calculated to obtain an average. This operation is performed in 5 fields of view, the averages obtained at the respective sites are further averaged, and the obtained value is adopted as the average inner diameter of the microcapsules. The major axis means the longest inner diameter of the microcapsules observed.

<Second Aspect>

The second aspect of the pressure-sensitive layer of the present disclosure is a pressure-sensitive layer having a color development-inducing layer containing an electron-accepting compound and a polymer matrix and a color-developing layer containing microcapsules, in which a substrate, the color development-inducing layer, and the color-developing layer are provided in this order, and the thickness of the color-developing layer is equal to or less than ½ of the thickness of the color development-inducing layer.

The details of components (such as a specific polymer compound, microcapsules, and an electron-accepting compound) used in the pressure-sensitive layer according to the second aspect are the same as those described above, and the preferred aspects of the components are also the same as those described above.

An example of the pressure measuring material having the pressure-sensitive layer according to the second aspect will be described with reference to a drawing.

Figure 3:
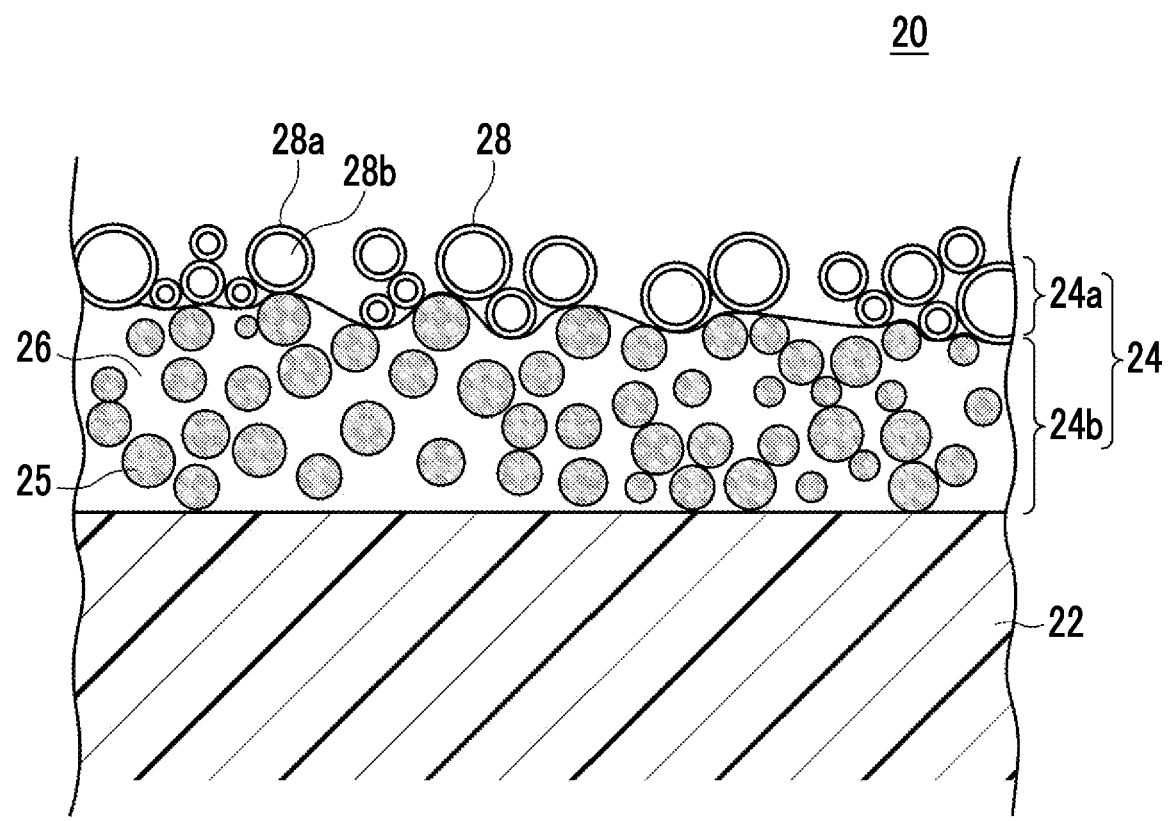
FIG. 3 is a schematic cross-sectional view showing an example of a pressure measuring material of the present disclosure.

FIG. 3 is a schematic cross-sectional view showing an example of the pressure measuring material having the pressure-sensitive layer according to the second aspect. Note that FIG. 3 is used to describe the second aspect, and the size and ratio of the constituents shown in the drawing are not the same as the actual ones.

In a pressure measuring material 20 shown in FIG. 3, a pressure-sensitive layer 24 is provided on a substrate 22. The pressure-sensitive layer 24 is formed of a color-developing layer 24a and a color development-inducing layer 24b. The color-developing layer 24a has microcapsules 28. The color development-inducing layer 24b has a polymer matrix 26 containing an electron-accepting compound 25 and the specific polymer compound. 28a represents the capsule wall of the microcapsules, and 28b represents inclusions (that is, core materials) of the microcapsules. The color-developing layer 24a preferably contains the specific polymer compound.

From the viewpoint of further improving gradation in a high pressure range of 100 MPa or higher, the thickness of the color-developing layer is preferably equal to or less than ½ and more preferably equal to or less than ⅓ of the thickness of the color development-inducing layer. The lower limit is not particularly limited. In an aspect of the present disclosure, the thickness of the color-developing layer is preferably 0.1% to 50%, more preferably 0.1% to 40%, and even more preferably 0.1% to 33% of the thickness of the color development-inducing layer.

The thickness of the color-developing layer and the color development-inducing layer can be measured by microscopy.

Specifically, a cross-sectional slice is prepared by vertically cutting the pressure measuring material as a measurement object. In this cross-sectional slice, a field of view of 800 μm×600 μm is observed with a scanning electron microscope (SEM). From the image, the thicknesses of the color-developing layer and the color development-inducing layer are measured at 10 sites at intervals of 50 μm, the arithmetic mean thereof is calculated, and the obtained value is adopted as the thickness of the color-developing layer and the color development-inducing layer. Examples of the scanning electron microscope include a desktop microscope "Miniscope TM3030Plus" (manufactured by Hitachi High-Tech Corporation).

As shown in FIG. 3, in a case where the color-developing layer has a site devoid of microcapsules, the thickness of the color-developing layer is regarded as 0 μm.

The second aspect can be particularly preferably used in a pressure range of 100 MPa to 500 MPa. From the viewpoint of excellent gradation in a high pressure range of 100 MPa to 500 MPa, the void volume of the pressure measuring material having the pressure-sensitive layer according to the second aspect is preferably 5 mL/m$^2$ to 20 mL/m$^2$, and more preferably more than 8 mL/m$^2$ and 15 mL/m$^2$ or less. The void volume is a value calculated by the equation described above.

In order that the void volume falls into a specific range, the electron-accepting compound in the second aspect preferably contains inorganic particles, more preferably contains inorganic particles as a main component, and even more preferably contains inorganic particles at a content of 50% by mass to 100% by mass. As the electron-accepting compound, for example, the electron-accepting compounds described above are preferable. The electron-accepting compound preferably includes acidic clay or activated clay. The electron-accepting compound in the second aspect may mainly consists of inorganic particles or may include other electron-accepting compounds.

From the viewpoint of excellent gradation in the high pressure range of 100 MPa to 500 MPa, the pressure-sensitive layer in the second aspect preferably contains inorganic particles other than the electron-accepting compound. Examples of inorganic particles other than the electron-accepting compound include the inorganic particles described above. As the inorganic particles, silica is preferable.

From the viewpoint of further improving gradation in a high pressure range of 100 MPa to 500 MPa, the pressure-sensitive layer (preferably the color development-inducing layer) in the second aspect preferably contains inorganic particles as an electron-accepting compound and inorganic particles not being an electron-accepting compound. In a case where the pressure-sensitive layer contains both the inorganic particles as an electron-accepting compound and inorganic particles not being an electron-accepting compound, the void volume can be kept in a specific range, and the probability that the electron-donating dye precursor having leaked out of the microcapsules may come into contact with the electron-accepting compound can be reduced. Accordingly, it is possible to obtain a material having suitable gradation in a high pressure range of 100 MPa to 500 MPa.

From the viewpoint of excellent gradation in a high pressure range of 100 MPa to 500 MPa, the arithmetic mean roughness Ra of the pressure measuring material according to the second aspect is preferably 2.0 μm to 10.0 μm.

The arithmetic mean roughness Ra corresponds to the arithmetic mean roughness Ra of the surface opposite to the substrate side. The arithmetic mean roughness Ra of the pressure measuring material according to the second aspect is preferably 2.0 μm to 8.0 μm, and more preferably 2.0 μm to 5.0 μm.

The arithmetic mean roughness Ra can be adjusted to 2.0 μm to 10.0 μm, for example, by the following methods (1) and (2) and a method as a combination of these.

(1) Method of Thinning Color-Developing Layer

Because the microcapsules are arranged not on the entire surface of the pressure-sensitive layer, the surface of the pressure-sensitive layer has sites where the microcapsules are present and sites where the microcapsules are absent. By using this fact, the method (1) can adjust the surface roughness.

(2) Method of Increasing Amount of Inorganic Particles Contained in Color Development-Inducing Layer This is a method of adjusting the surface roughness of the color development-inducing layer by utilizing the difference between the site where inorganic particles are present and the site where inorganic particles are absent.

Particularly, in a case where the amount of inorganic particles (total amount of inorganic particles as an electron-accepting compound and inorganic particles not being an electron-accepting compound) is larger than the total amount of the specific polymer compound in the color development-inducing layer, the particles are exposed on the surface of the color development-inducing layer. Therefore, the color development-inducing layer is likely to be a rough surface. Furthermore, in a case where the microcapsules and the specific polymer compound are disposed as a thin layer on the color development-inducing layer, the microcapsules are stuck in the recesses of the rough color development-inducing layer. As a result, it is easy to obtain a pressure measuring material having the arithmetic mean roughness Ra of 2.0 μm to 10.0 μm.

In such a material having an arithmetic mean roughness Ra of 2.0 μm to 10.0 μm, some microcapsules are stuck in recesses of the color development-inducing layer and thus not disrupted even under high pressure conditions, or microcapsules are absent in some regions within the surface. It is considered that for this reason, the pressure measuring material of the second aspect can be suited for high pressure range of 100 MPa to 500 MPa.

In the second aspect, it is preferable that there be no microcapsules on the entire surface of the pressure-sensitive layer opposite to the substrate side. The proportion of the microcapsules is preferably 95% by area or less, and more preferably 90% by area or less.

The proportion of the microcapsules can be measured, for example, by a method of first observing the material from the surface at any position of the color-developing layer by using a laser microscope (KEYENCE VK-8510, size of field of view: 100 μm×150 μm), counting all the microcapsules observed in the field of view, calculating the area of the counted microcapsules observed in the field of view by image analysis, and dividing the calculated area by the area of the field of view.

From the viewpoint of facilitating the microcapsules to be stuck in the recesses of the color development-inducing layer and obtaining excellent gradation in a high pressure range of 100 MPa to 500 MPa, the amount of total solid content of a color-developing layer-forming composition is preferably smaller than the amount of total solid content of a color development-inducing layer-forming composition. The amount of total solid content of the color-developing layer-forming composition is more preferably 0.1% to 45% and more preferably 0.5% to 25% of the amount of total solid content of the color development-inducing layer-forming composition.

Particle Diameter $d_2$ of Microcapsules

In the second aspect, "particle diameter $d_2$ of microcapsules" means an average particle diameter.

The average particle diameter of the microcapsules is determined by a method of imaging the surface of the color-developing layer where microcapsules are present by using an optical microscope (OLYMPUS BX60, size of field of view: 320 μm×450 μm), performing image analysis on the obtained image, measuring the major axis (particle diameter) of 30 microcapsules in order from the largest microcapsules, and calculating the arithmetic mean thereof to obtain an average. This operation is performed at any 5 sites (5 fields of view) in a first layer, the averages obtained at the respective sites are further averaged, and the obtained value is adopted as the average particle diameter of the microcapsules. The major axis means the longest diameter of the microcapsules observed.

From the viewpoint of color developability in a high pressure range (preferably 100 MPa to 10,000 MPa, and more preferably 300 MPa to 3,000 MPa), the particle diameter $d_2$ of the microcapsules is preferably 1 μm to 50 μm, and more preferably 5 μm to 30 μm.

Inner Diameter $p_2$ of Microcapsules

From the viewpoint of further improving gradation in a high pressure range of 100 MPa to 500 MPa and from the viewpoint of color developability in a high pressure range, an inner diameter $p_2$ of the microcapsules is preferably 1 μm to 50 μm, more preferably 2 μm to 20 μm, and even more preferably 2 μm to 15 μm.

In the second aspect, "inner diameter $p_2$ of the microcapsules" is a value obtained by the following method.

First, the wall thickness of the microcapsules is determined. The wall thickness of the microcapsules refers to the thickness (μm) of a capsule wall forming the capsule particles of the microcapsules. The number-average wall thickness refers to a value obtained by measuring the thickness (μm) of the capsule wall of 5 microcapsules by using a scanning electron microscope (SEM) and calculating the average thereof. More specifically, a cross-sectional slice of the microcapsules existing in the pressure measuring material is prepared, the cross section is observed with SEM at a 15,000× magnification, and 5 microcapsules are randomly selected which have major axis in a range of (average particle diameter of microcapsules)×0.9 to (average particle diameter of microcapsules)×1.1. Then, the cross section of each of the selected microcapsules is observed, the capsule wall thickness is determined, and the average thereof is calculated. The major axis means the longest diameter of the microcapsules observed. The inner diameter of the microcapsules is calculated by average particle diameter−(wall thickness of microcapsules×2).

<Formation of Pressure-Sensitive Layer>

The formation of the pressure-sensitive layer is not particularly limited as long as the pressure-sensitive layer is formed by a step of forming a pressure-sensitive layer containing a polymer matrix containing a polymer compound having a molecular weight of 1,000 or more (specific polymer compound), microcapsules encapsulating an electron-donating dye precursor and a solvent, and an electron-accepting compound.

In the first aspect, the pressure-sensitive layer can be formed by preparing a pressure-sensitive layer-forming composition, applying the composition to a substrate (for example, by means of coating), and drying the composition.

That is, the pressure measuring material having the pressure-sensitive layer of the first aspect is preferably obtained by a manufacturing method having a step of disposing a pressure-sensitive layer-forming composition on a substrate, in which the composition contains a polymer matrix containing a specific polymer compound, microcapsules encapsulating an electron-donating dye precursor and a solvent, and an electron-accepting compound.

The pressure-sensitive layer-forming composition used for forming the pressure-sensitive layer of the first aspect can be prepared, for example, by preparing a microcapsule dispersion, and mixing the obtained dispersion with a solution (or emulsion) of a specific polymer compound (polymer compound forming a polymer matrix), an electron-accepting compound, and other optional components (for example, oil-absorbing particles and the like).

In the second aspect, the pressure-sensitive layer can be formed, for example, by preparing 2 kinds of compositions consisting of a color development-inducing layer-forming composition and a color-developing layer-forming composition as a pressure-sensitive layer-forming composition, applying the color development-inducing layer-forming composition to a substrate (for example, by means of coating), applying the color-developing layer-forming composition thereon (for example, by means of coating), and drying the compositions. The color-developing layer-forming composition can be prepared, for example, by preparing a microcapsule dispersion, mixing the obtained dispersion with a solution (or emulsion) of a specific polymer compound and other optional components (for example, a surfactant and the like). The color development-inducing layer-forming composition can be prepared, for example, by mixing together an electron-accepting compound, a solution (or emulsion) of a specific polymer compound, and other optional components (for example, inorganic particles and the like).

That is, the pressure measuring material having the pressure-sensitive layer of the second aspect is preferably obtained by a manufacturing method including a step of obtaining a color-developing layer-forming composition containing a solvent (preferably a solvent having a boiling point of 130° C. or lower) and microcapsules encapsulating an electron-donating dye precursor and a solvent (preferably a solvent having a boiling point of 130° C. or higher), a step of obtaining a color development-inducing layer-forming composition containing an electron-accepting compound and a polymer compound (specific polymer compound) having a molecular weight of 1,000 or more, a step of disposing the color development-inducing layer-forming composition on a substrate so as to form a color development-inducing layer, and a step of disposing the color-developing layer-forming composition on the color development-inducing layer so as to form a color-developing layer.

The color-developing layer-forming composition preferably contains a polymer compound (specific polymer compound) having a molecular weight of 1,000 or more.

The color development-inducing layer-forming composition may contain one kind of specific polymer compound or two or more kinds of specific polymer compounds in combination. The color-developing layer-forming composition may contain one kind of specific polymer compound or two or more kinds of specific polymer compounds in combination. Furthermore, the specific polymer compounds contained in the color development-inducing layer-forming composition and the color-developing layer-forming composition may be the same polymer compounds or different polymer compounds.

In forming the pressure-sensitive layer, the specific preparation method, coating amount, and drying conditions of the pressure-sensitive layer-forming composition and the like may be appropriately determined depending on the type of components to be incorporated into the pressure-sensitive layer-forming composition, the specific aspect of the targeted pressure measuring material, and the like.

In a case where the pressure-sensitive layer is formed by coating a substrate with the pressure-sensitive layer-forming composition, the coating can be performed by known coating methods. Examples of the coating method include coating methods using an air knife coater, a rod coater, a bar coater, a curtain coater, a gravure coater, an extrusion coater, a die coater, a slide bead coater, a blade coater, and the like.

[Other Layers]

The pressure measuring material of the present disclosure may have other layers on the substrate in addition to the pressure-sensitive layer.

Examples of those other layers include a protective layer, a white layer, an easy adhesion layer, and the like.

Protective Layer

The pressure measuring material of the present disclosure may additionally have a protective layer on a side of the pressure-sensitive layer opposite to the other side provided with the substrate. The pressure measuring material of the present disclosure can have a protective layer as an outermost layer, but is not limited to this aspect.

Because high pressure is applied to the pressure measuring material of the present disclosure, the solvent (oil component) encapsulated in the microcapsules tends to easily leach out of the pressure-sensitive layer. Leaking of the oil component is not desirable because it can cause oil stains. In a case where the pressure measuring material has a protective layer, it is possible to effectively inhibit the oil component from leaking out of the pressure-sensitive layer.

Therefore, the protective layer is preferably a layer that exhibits low permeability to the oil component.

The protective layer can be provided by sticking a sheet or film for forming a protective layer onto the pressure-sensitive layer.

In a case where the protective layer is to be provided by sticking the sheet or film for forming a protective layer, a desired sheet or film for forming a protective layer may be prepared and stuck onto the pressure-sensitive layer by known methods (for example, sticking using an adhesive and the like).

The thickness of the protective layer is not particularly limited, and can be selected depending on the purpose and the like.

The thickness of the protective layer is preferably 0.1 µm to 50 µm, and more preferably 0.5 µm to 10 µm.

White Layer

The pressure measuring material of the present disclosure may additionally have a white layer between the substrate and the pressure-sensitive layer.

In a case where the material has a white layer, it is possible to increase the contrast between a color-developing portion and a non-color-developing portion and improve visibility.

The white layer may be a coating layer formed between the substrate and the pressure-sensitive layer by using a composition for forming a white layer, or a layer provided by sticking a sheet or film for forming a white layer onto the substrate before the pressure-sensitive layer is provided.

The white layer can be provided, for example, as a layer containing a known white coloring material (for example, a white pigment or the like), a resin component, and the like.

Specific examples of the white coloring material include white pigments such as titanium dioxide, zinc oxide, and calcium carbonate.

The white layer is a layer that does not contain the microcapsules and/or electron-accepting compound described above.

In a case where the white layer is to be provided by coating the substrate with the composition for forming a white layer, for example, the composition for forming a white layer may be prepared, applied to the substrate (for example, by means of coating), and dried. In this case, the same method as that used for forming the pressure-sensitive layer can be used as a coating method.

In a case where the white layer is to be provided by sticking a sheet or film for forming a white layer, a desired sheet or film for forming a white layer may be prepared and stuck onto the substrate by known methods (for example, sticking using an adhesive and the like).

Easy Adhesion Layer

The easy adhesion layer is preferably provided to improve the adhesiveness between the substrate and the pressure-sensitive layer.

In a case where the pressure measuring material of the present disclosure has an easy adhesion layer, it is preferable to adopt an aspect in which the material has at least a substrate, an easy adhesion layer, and a pressure-sensitive layer provided in this order.

In a case where the pressure measuring material has an easy adhesion layer and a white layer, it is preferable to adopt an aspect in which the material has a substrate, an easy adhesion layer, a white layer, and a pressure-sensitive layer provided in this order.

The easy adhesion layer is a layer that does not contain the microcapsules and/or electron-accepting compound described above.

From the viewpoint of improving the adhesiveness between the substrate and the polymer matrix included in the pressure-sensitive layer, the easy adhesion layer preferably contains a resin.

Examples of the resin include an acrylate resin, a urethane resin, a styrene resin, and a vinyl resin.

The easy adhesion layer may be a layer containing a urethane polymer, a blocked isocyanate, or the like.

The easy adhesion layer can be formed, for example, by bonding a substrate and an easily adhesive sheet or film together, and coating the substrate with an easy adhesion layer-forming composition.

The thickness of the easy adhesion layer is not particularly limited, and can be selected depending on the purpose and the like.

The thickness of the easy adhesion layer is preferably 0.005 μm to 1.0 μm, more preferably 0.005 μm to 0.5 μm, even more preferably 0.005 μm to 0.2 μm, and still more preferably 0.01 μm to 0.1 μm.

(Thickness of Pressure Measuring Material)

The thickness of the pressure measuring material of the present disclosure is not particularly limited, and is preferably 10 μm to 800 μm and more preferably 10 μm to 500 μm.

Thickness T

A thickness T of a layer calculated by subtracting the thickness of the substrate from the thickness of the pressure measuring material is preferably 1 μm to 250 μm, more preferably 3 μm to 200 μm, and even more preferably 5 μm to 150 μm.

The thickness T can be measured by the same method as that used for measuring the thickness t of the pressure-sensitive layer described above.

Specifically, the thickness T can be determined by measuring the thickness of the pressure measuring material and the thickness of the substrate at 10 sites that are randomly selected, calculating the difference between the thickness of the pressure measuring material and the thickness of the substrate, and calculating an arithmetic mean of the calculated value.

(Arithmetic Mean Roughness Ra of Pressure Measuring Material)

The arithmetic mean roughness Ra of the pressure measuring material is preferably 10.0 μm or less.

The preferred range of the arithmetic mean roughness Ra in a case where the pressure-sensitive layer is a layer of the first aspect and the second aspect is as described above.

The arithmetic mean roughness Ra corresponds to the arithmetic mean roughness Ra of the surface opposite to the substrate side. The method for measuring the arithmetic mean roughness Ra is as described above.

(Ratio of Thickness T to Inner Diameter p of Microcapsules)

In the pressure measuring material, the ratio of the thickness T to the inner diameter p of the microcapsules, T/p, is preferably 1.2 or more, and more preferably 1.3 or more. In a case where T/p is 1.2 or more, the gradation in a high pressure range of 100 MPa or higher is further improved. T/p is more preferably 1.2 to 5.

In a case where the pressure measuring material has the pressure-sensitive layer of the first aspect, the ratio of the thickness T to the inner diameter $p_1$ of the microcapsules, $T/p_1$, is preferably 5 or less, more preferably 1.2 to 5, and even more preferably 1.2 to 3.

In a case where the pressure measuring material has the pressure-sensitive layer of the second aspect, the ratio of the thickness T to the inner diameter $p_2$ of the microcapsules, $T/p_2$, is preferably 5 or less, more preferably 1.2 to 5, and even more preferably 1.3 to 5.

<Matters Relating to Pressure Measurement>

The pressure measurement using the pressure measuring material of the present disclosure can be performed by placing the pressure measuring material at the site where pressure or pressure distribution is to be measured, and applying pressure to the pressure measuring material in this state.

The pressure may be any of point pressure, linear pressure, or surface pressure.

In a case where the pressure measuring material of the present disclosure is caused to develop color, a density difference (ΔD) calculated by subtracting the density of color developed by applying a pressure of 2,000 MPa from the density of color developed by applying a pressure of 1,000 MPa is preferably 0.6 or more.

In a case where ΔD is more than 0.6, the obtained pressure measuring material of the present disclosure can provide more visible or readable density and can better reproduce density gradation in a case where pressure is applied thereto for developing color.

In a case where the pressure measuring material having the pressure-sensitive layer of the first aspect is caused to develop color, a density difference (ΔD) calculated by subtracting the density of color developed by applying a pressure of 1,000 MPa from the density of color developed by applying a pressure of 2,000 MPa is preferably 0.1 or more, and more preferably 0.4 or more.

In a case where ΔD is 0.1 or more (preferably 0.4 or more), the obtained pressure measuring material of the present aspect can provide more visible or readable density and can better reproduce density gradation in a case where a pressure of 500 MPa or higher is applied thereto for developing color.

In a case where the pressure measuring material having the pressure-sensitive layer of the second aspect is caused to develop color, a density difference (ΔD2) calculated by subtracting the density of color developed by applying a pressure of 100 MPa from the density of color developed by applying a pressure of 500 MPa is preferably 0.1 or more, and more preferably 0.4 or more.

In a case where ΔD2 is 0.1 or more (preferably 0.4 or more), the obtained pressure measuring material of the present aspect can provide more visible or readable density and can better reproduce density gradation in a case where a pressure of 100 MPa to 500 MPa is applied thereto for developing color.

The density of color developed is a value measured using a reflection densitometer (for example, RD-19I manufactured by GretagMacbeth GmbH).

In a case where pressure which is preferably 100 MPa to 10,000 MPa (more preferably 100 MPa to 3,000 MPa) is applied to the pressure measuring material of the present disclosure, the material exhibits properties in which the density of color developed increases as the pressure increases, that is, gradation of color development.

For the pressure measuring material of the present disclosure, the gradation of color development is preferably properties in which the density of color developed linearly increases as the pressure increases (that is, the pressure and the density of color developed are proportional to each other).

For the pressure measuring material of the present disclosure, a range of pressure to be measured including the aforementioned range can be set depending on the purpose of measurement. For example, in an aspect of the pressure measuring material of the present disclosure, the material can be used for measuring pressure in a range of 1,000 MPa or higher (for example, 1,000 MPa to 3,000 MPa, and preferably 1,000 MPa to 2,000 MPa). Furthermore, in another aspect of the pressure measuring material of the present disclosure, the material can be used for measuring pressure in a pressure range lower than 1,000 MPa (for example, 100 MPa to 500 MPa).

The pressure measuring material of the present disclosure may be used, for example, for the following uses in various fields. However, the use of the material is not limited thereto. Some of the uses exemplified below overlap each other.

For example, the pressure measuring material of the present disclosure may be used for manufacturing of vehicles such as automobiles or aircraft (for example, checking pressure distribution in molding of various constituent members, bodies, and the like or assembly of constituent members), construction (for example, checking pressure distribution in assembly of building materials), manufacturing of electronic products (for example, checking pressure distribution in curved surface machining (bonding of curved surface display or the like)), transport (for example, checking impact force applied to cargo due to transport), metal processing (for example, checking mold contact in the manufacture of various metal products), molding of resin products (for example, checking mold contact during molding of resin products), molding of pharmaceuticals (for example, checking pressure distribution in making tablets), furniture (for example, checking pressure distribution within surface of furniture (such as the seat of a chair, sofa, and the like), stationery (for example, checking grip force applied to writing materials and the like), sports equipment (for example, checking impact force applied to an article (such as a ball) constituted with an elastic material), and the like.

EXAMPLES

Hereinafter, the present invention will be more specifically described with reference to examples. As long as the gist of the present invention is maintained, the present is not limited to the following examples. Unless otherwise specified, "%" and "part" are based on mass.

Example 1

Preparation of Microcapsule Solution (A) Encapsulating Electron-Donating Dye Precursor As an electron-donating dye precursor, 10 parts of the following compound (A) was dissolved in 53 parts of linear alkylbenzene (JX Nippon Oil & Energy Corporation, grade alkene L, boiling point: 130° C. or higher), thereby obtaining a solution A.

Then, 14 parts of synthetic isoparaffin (Idemitsu Kosan Co., LTD., IP solvent 1620, boiling point: 130° C. or higher) and 0.4 parts of N,N,N',N'-tetrakis(2-hydroxypropyl)ethylenediamine (ADEKA CORPORATION, ADEKA polyether EDP-300) dissolved in 1.2 parts of ethyl acetate were added to the solution A being stirred, thereby obtaining a solution B.

Furthermore, 18 parts of a trimethylolpropane adduct (DIC Corporation, BURNOCK D-750) of tolylene diisocyanate dissolved in 3 parts of ethyl acetate was added to the solution B being stirred, thereby obtaining a solution C.

The solution C was added to a solution obtained by dissolving 8 parts of polyvinyl alcohol (PVA-205, KURARAY CO., LTD., number-average molecular weight: 25,000, dispersant) in 110 parts of water, and the mixture was emulsified and dispersed. Water (340 parts) was added to the emulsion obtained after emulsification and dispersion, and the mixture was heated to 70° C. with stirring, stirred for 1 hour, and then cooled.

Water was further added to the cooled solution so that the concentration was adjusted, thereby obtaining a microcapsule solution (A) encapsulating an electron-donating dye precursor having a concentration of solid contents of 25%.

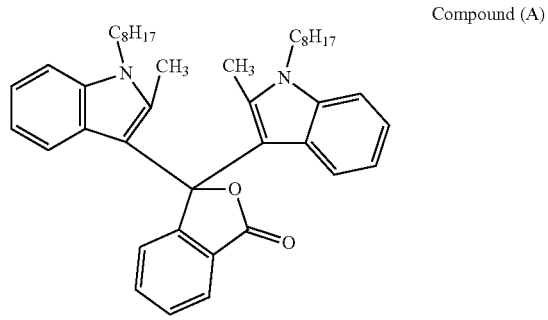
Compound (A)

The volume-based median diameter (D50) of the obtained microcapsules was 11 μm.

The volume-based median diameter was measured using Microtrac MT3300EXII (manufactured by NIKKISO CO., LTD.).

Preparation of Pressure Measuring Sheet (A)

The microcapsule solution (A) (20 parts by mass) was mixed with 11 parts of a 40% dispersion of zinc 3,5-bis(α-methylbenzyl) salicylate which is an electron-accepting compound as a developer and 20 parts of a 20% aqueous solution of polyvinyl alcohol (PVA-105, KURARAY CO., LTD. number-average molecular weight: 22,000) as a specific polymer compound forming a polymer matrix, thereby obtaining a pressure-sensitive layer-forming composition (A).

By using a bar coater, a 75 μm thick PET substrate (A4300: manufactured by TOYOBO CO., LTD.) was coated with the obtained pressure-sensitive layer-forming composition (A) so that a 15 μm thick film was obtained after drying, and the composition was dried at 80° C., thereby obtaining a pressure measuring sheet (A) (pressure measuring material) having a pressure-sensitive layer on a PET substrate.

A vertically cut cross section of the pressure measuring sheet (A) was observed with a desktop microscope "Miniscope TM3030Plus" (manufactured by Hitachi High-Tech Corporation), and the thickness of the pressure measuring sheet (A) and the thickness of the PET substrate at 10 random sites were measured. Furthermore, the difference between the thickness of the pressure measuring sheet (A) and the thickness of the PET substrate was calculated, and the arithmetic mean thereof was determined and adopted as the thickness (film thickness) of the pressure-sensitive layer. It was confirmed that the thickness (film thickness) of the pressure-sensitive layer was 15 μm.

The ratio (t/d) of the thickness t of the pressure-sensitive layer to the particle diameter d of the microcapsules is 1.36.

The Martens hardness of polyvinyl alcohol (PVA-105, KURARAY CO., LTD.) forming a polymer matrix was measured using a "microhardness tester HM2000" manufactured by FISCHER instruments. For measurement, in a laboratory environment of 23° C. and 50% RH, first, a load ranging from 0 mN to the maximum test load was applied for 10 seconds by using a diamond indenter (Berkovich indenter), then the maximum test load was kept for 5 seconds, and lastly a load ranging from the maximum test load to 0 mN was applied for 10 seconds. The maximum test load was divided by the indenter surface area at the maximum indentation depth, and the obtained value was adopted as a Martens hardness ($N/mm^2$).

Under a maximum test load set to obtain a maximum indentation depth of 0.5 μm, the measured Martens hardness of a 5 μm thick polymer matrix (PVA105) film formed on a glass substrate was 165 N/mm².

<Color Development Evaluation A>

The pressure measuring sheet (A) of Example 1 obtained as above was cut into four samples having a length of 9 cm to 11 cm.

Any of the pressure shown in the column of Pressure in the following Table 1 was applied to each of the samples. As a result, it was confirmed that the samples developed color due to the application of pressure. Pressure was applied using a press machine (DSF-C1-A, manufactured by AIDA ENGINEERING, LTD.).

The density of color developed by the samples performing color development was measured using a spectrodensitometer (X-Rite 504 manufactured by X-Rite, Incorporated). The measurement results are shown in the column of Color density in Table 1.

FIG. 1 is a graph showing the relationship between the pressure and the density of color developed.

TABLE 1

| Sample No. | Pressure (MPa) | Density of color developed |
|---|---|---|
| 1 | 912 | 0.31 |
| 2 | 1,267 | 0.37 |
| 3 | 1,508 | 0.46 |
| 4 | 1,824 | 1.06 |

As shown in Table 1 and FIG. 1, it has been confirmed that the pressure measuring sheet of Example 1 can perform color development with excellent gradation in a high pressure range higher than 1,000 MPa.

Example 2

A pressure measuring sheet (pressure measuring material) of Example 2 was prepared in the same manner as in Example 1, except that a part of PVA-105 used in preparing the pressure measuring sheet (A) was replaced with a polyol polyalkylene alkyl ether surfactant (NOIGEN LP-90, manufactured by DKS Co., Ltd.).

Examples 3 to 8

Pressure measuring sheets of Examples 3 to 8 were prepared in the same manner as in Example 2, except that the composition of each material was changed as shown in Table 2.

A microcapsule solution (B) was prepared as below.

Preparation of Microcapsule Solution (B)
Encapsulating Electron-Donating Dye Precursor As electron-donating dye precursors, 6 parts of 3',6'-bis(diethylamino)-2-(4-nitrophenyl)spiro[isoindole-1,9'-xanthen]-3-one (Pink-DCF, manufactured by Hodogaya Chemical Co., Ltd.) and 8 parts of 6'-(diethylamino)-1',3'-dimethylfluorane (Orange-DCF manufactured by Hodogaya Chemical Co., Ltd.) were dissolved in 70 parts of Hisol SAS-296 (oil component (solvent) manufactured by Nippon Oil Corporation; a mixture of 1-phenyl-1-xylylethane and 1-phenyl-1-ethylphenylethane), thereby obtaining a solution A2. Then, 19 parts of synthetic isoparaffin (Idemitsu Kosan Co., LTD., IP solvent 1620) and 0.7 parts of N,N,N',N'-tetrakis(2-hydroxypropyl)ethylenediamine (ADEKA COR-PORATION, ADEKA polyether EDP-300) dissolved in 2.5 parts of methyl ethyl ketone were added to the solution A2 being stirred, thereby obtaining a solution B2. Furthermore, 77 parts of a trimethylolpropane adduct (DIC Corporation, BURNOCK D-750, containing 25% ethyl acetate) of tolylene diisocyanate dissolved in 6 parts of ethyl acetate was added to the solution B2 being stirred, thereby obtaining a solution C2. The solution C2 was added to a solution obtained by dissolving 10 parts of polyvinyl alcohol (KL-318, KURARAY CO., LTD.) in 140 parts of water, and the mixture was emulsified and dispersed. Water (200 parts) was added to the emulsion obtained after emulsification and dispersion, and the mixture was heated to 70° C. with stirring, stirred for 1 hour, and then cooled. Water was added thereto to adjust the concentration, thereby preparing a microcapsule solution (B) encapsulating an electron-donating dye precursor having a concentration of solid contents of 20% by mass. The median diameter of the microcapsules was 8 μm.

Comparative Example 1

According to Example 1 of JP2009-019949A, a two-sheet type pressure measuring sheet consisting of an electron-donating colorless dye sheet and a developer sheet was produced.

[Evaluation]

"Measurement of void volume" was performed on the pressure-sensitive layers of the pressure measuring sheets of Examples 1 to 8.

In addition, the pressure measuring sheets of Examples 2 to 8 and Comparative Example 1 was evaluated by the following "density gradation evaluation A" and "color development evaluation B".

[Measurement of Void Volume]

Each pressure measuring sheet (PET films on which a pressure-sensitive layer was formed) of Examples 1 to 8 was cut in 10 cm×10 cm, and the mass ($m_1$) thereof was measured. Then, diethylene glycol was applied to a surface provided with the pressure-sensitive layer and caused to permeate the material, the diethylene glycol remaining on the surface was wiped off, and then a mass ($m_2$) was measured. Then, $X=m_2-m_1$ was calculated, and the void volume was calculated from the following equation. The density of the diethylene glycol is 1.118.

$$\text{Void volume}(m_1/m_2)=100\times X \div 1.118$$

All the pressure measuring sheets obtained in Examples 1 to 8 had a void volume of 1 mL/m² or less.

[Density Gradation Evaluation a (1,000 MPa to 2,000 MPa)]

For the pressure measuring sheets of Examples 1 to 8 and Comparative Example 1, the density of color developed at 1,000 MPa and the density of color developed at 2,000 MPa were measured, and a difference ΔD1 was calculated by subtracting the density of color developed at 1,000 MPa from the density of color developed at 2,000 MPa and evaluated according to the following evaluation standard.

The pressure application method and the measurement device were the same as those in Color development evaluation A.

Pressure measuring sheets graded "A" and "B" are within the acceptable range for practical use, and pressure measuring sheets graded "A" are the most excellent. The results are shown in Table 2.

<Evaluation Standard>
"A": ΔD1 is 0.4 or more.
"B": ΔD1 is 0.1 or more and less than 0.4.
"C": ΔD1 is less than 0.1.

[Color Development Evaluation B]

The pressure measuring sheets of Examples 1 to 8 and Comparative Example 1 were evaluated according to the following evaluation standard, based on the measurement result of density of color developed at 1,000 MPa that was obtained in Density gradation evaluation A described above. The results are shown in Table 2.

<Evaluation Standard>
"A": The density of color developed is 0.5 or more.
"B": The density of color developed is less than 0.5.

In Table 2, T is a thickness of a layer calculated by subtracting the thickness of the substrate from the thickness of the pressure measuring material, $T/p_1$ is the ratio of the thickness T to the inner diameter $p_1$ of the microcapsules, $T/d_1$ is the ratio of the thickness T to the particle diameter $d_1$ (median diameter) of the microcapsules, and Ra is the arithmetic mean roughness of the outermost surface (surface of the pressure-sensitive layer) on the side opposite to the substrate. All of these are values obtained by the methods described above.

In Table 2, "-" means that the content of the corresponding component is zero or the corresponding item is not measured.

TABLE 2

| | Form of Sheet | Microcapsule | Amount in pressure-sensitive layer [% by mass] | | | | Physical properties Particle diameter $d_1$ of capsule |
|---|---|---|---|---|---|---|---|
| | | | | Electron-accepting compound | Specific polymer compound | Surfactant | |
| Example 1 | Mono-sheet | Solution (A) | 34.4 | Salicylate | 32.8 | 32.8 | 0 | 11 |
| Example 2 | Mono-sheet | Solution (A) | 34.4 | Salicylate | 32.8 | 32.7 | 0.1 | 11 |
| Example 3 | Mono-sheet | Solution (A) | 49.2 | Salicylate | 32.8 | 17.9 | 0.1 | 11 |
| Example 4 | Mono-sheet | Solution (A) | 50.9 | Salicylate | 24.5 | 24.5 | 0.1 | 11 |
| Example 5 | Mono-sheet | Solution (A) | 38.7 | Salicylate | 30.6 | 30.6 | 0.1 | 11 |
| Example 6 | Mono-sheet | Solution (B) | 34.4 | Salicylate | 32.8 | 32.7 | 0.1 | 8 |
| Example 7 | Mono-sheet | Solution (B) | 34.4 | Salicylate | 32.8 | 32.7 | 0.1 | 8 |
| Example 8 | Mono-sheet | Solution (A) | 34.4 | Activated clay | 32.8 | 32.7 | 0.1 | 11 |
| Comparative Example 1 | Two-sheet | Solution (C) | — | Activated clay | — | — | — | 20 |

| | Physical properties | | | | | Evaluation result | |
|---|---|---|---|---|---|---|---|
| | Inner diameter $p_1$ of capsule | Thickness T [μm] | $T/d_1$ | $T/p_1$ | Capsule content [% by volume] | Ra | Density gradation evaluation A (1,000 MPa~2,000 MPa) | Color development evaluation B (1,000 MPa) |
| Example 1 | 10.5 | 15 | 1.36 | 1.4 | 35 | Less than 1.0 | A | A |
| Example 2 | 10.5 | 15 | 1.36 | 1.4 | 35 | Less than 1.0 | A | A |
| Example 3 | 10.5 | 15 | 1.36 | 1.4 | 50 | 1.0 | B | A |
| Example 4 | 10.5 | 15 | 1.36 | 1.4 | 50 | Less than 1.0 | A | A |
| Example 5 | 10.5 | 20 | 1.8 | 1.9 | 40 | Less than 1.0 | A | A |
| Example 6 | 6.9 | 15 | 1.9 | 2.2 | 35 | Less than 1.0 | A | A |
| Example 7 | 6.9 | 20 | 2.5 | 2.9 | 35 | Less than 1.0 | A | A |
| Example 8 | 10.5 | 15 | 1.36 | 1.4 | 35 | 1.1 | B | A |
| Comparative Example 1 | 19.8 | — | — | — | — | — | C | A |

Example 9

Preparation of Color Development-Inducing Layer-Forming Composition

A 10% by mass aqueous sodium hydroxide solution (10 parts), 750 parts of water, and 1 part of sodium hexametaphosphate (Nippon Chemical Industrial CO., LTD.) were added to 100 parts of activated clay: SILTON F-242 (MIZUSAWA INDUSTRIAL CHEMICALS, LTD.) as an electron-accepting compound, 100 parts of amorphous silica (MIZUSAWA INDUSTRIAL CHEMICALS, LTD., MIZUKASIL P-78A, inorganic particles not being an electron-accepting compound), and the mixture was dispersed using a homogenizer. This mixture was further mixed with 140 parts of a modified acrylic acid ester copolymer (ZEON CORPORATION, Nipol LX814, concentration of solid contents: 47%, specific polymer compound), 28 parts of an anionic olefin-based resin (Arakawa Chemical Industries, Ltd., POLYMARON 482, concentration of solid contents: 25%, specific polymer compound), 5 parts of a 15% aqueous solution of a side chain alkylbenzene sulfonic acid amine salt (DKS Co., Ltd., NEOGEN T), 35 parts of a 1% aqueous solution of polyoxyethylene polyoxypropylene lauryl ether (DKS Co., Ltd., NEOGEN LP-70), and 35 parts of a 1% aqueous solution of sodium-bis(3,3,4,4,5,5,6,6,6-nonafluorohexyl)-2-sulfinatooxysuccinate (FUJIFILM Corporation, W-AHE), thereby preparing a color development-inducing layer-forming composition containing electron-accepting compounds.

Preparation of Color-Developing Layer-Forming Composition

The 20% microcapsule solution (B) encapsulating an electron-donating dye precursor (70 parts) obtained as above was further mixed with 0.8 parts of an anionic olefin-based resin (Arakawa Chemical Industries, Ltd., POLYMARON 482, concentration of solid contents: 25%, specific polymer compound), 3.1 parts of a polymer (Rohm and Haas Company, OROTAN 165A, concentration of solid contents: 21%, specific polymer compound), 0.5 parts of a 15% aqueous solution of side chain alkylbenzene sulfonate amine salt (DKS Co., Ltd., Neogen T), 5 parts of a 1% aqueous solution of polyoxyethylene polyoxypropylene lauryl ether (DKS Co., Ltd., NEOGEN LP-70), and 5 parts of a 1% aqueous solution of sodium-bis(3,3,4,4,5,5,6,6,6-nonafluorohexyl)-2-sulfinatooxysuccinate (FUJIFILM Corporation, W-AHE), thereby preparing a color-developing layer-forming composition.

Preparation of Pressure Measuring Material

By using a bar coater, a 75 μm thick polyethylene terephthalate (PET) film (A4300: manufactured by TOYOBO CO., LTD.) was coated with the color development-inducing layer-forming composition obtained as above in a solid coating amount of coating amount of 20 g/m$^2$, thereby forming a color development-inducing layer. Next, by using a bar coater, the color development-inducing layer formed by coating was coated with the color-developing layer-forming composition in a solid coating amount of 3.5 g/m$^2$, thereby forming a color-developing agent layer.

In this way, a monosheet-type pressure measuring material was prepared which had a PET film as a substrate and a pressure-sensitive layer that was on the substrate and consisted of two layers, a color development-inducing layer and a color-developing agent layer, provided in this order.

Examples 10 to 14

Pressure measuring sheets of were prepared in the same manner as in Example 9, except that the composition of each material was changed as shown in Table 3.

Comparative Example 2

The same pressure measuring sheet as the two-sheet type pressure measuring sheet used in Comparative Example 1 described above was used.

[Evaluation]

"Measurement of void volume" was performed on the pressure measuring sheets of Examples 9 to 14.

In addition, the pressure measuring sheets of Examples 9 to 14 and Comparative Example 2 were evaluated by the following "density gradation evaluation B" and "color development evaluation C".

[Measurement of Void Volume]

The void volume of the pressure measuring sheets of Examples 9 to 14 was measured in the same manner as in the pressure measuring sheets of Examples 1 to 8 described above.

All the pressure measuring sheets obtained in Examples 9 to 14 had a void volume in a range of 5 mL/m$^2$ to 20 mL/m$^2$.

[Density Gradation Evaluation B (100 MPa to 500 MPa)]

For the pressure measuring sheets of Examples 9 to 14 and Comparative Example 2, the density of color developed at 100 MPa and the density of color developed at 500 MPa were measured. A difference ΔD2 was calculated by subtracting the density of color developed at 100 MPa from the density of color developed at 500 MPa, and evaluated according to the following evaluation standard.

The pressure application method and the measurement device were the same as those in Color development evaluation A.

Pressure measuring sheets graded "A" and "B" are within the acceptable range for practical use, and pressure measuring sheets graded "A" are the most excellent. The results are shown in Table 3.

<Evaluation Standard>

"A": ΔD2 is 0.4 or more.

"B": ΔD2 is 0.1 or more and less than 0.4.

"C": ΔD2 is less than 0.1.

[Color Development Evaluation C]

For the pressure measuring sheets of Examples 9 to 14 and Comparative Example 2, the density of color developed at 300 MPa was measured. The pressure application method and the measurement device were the same as those in Color development evaluation A.

Based on the obtained measurement results, evaluation was performed according to the following evaluation standard. The results are shown in Table 3.

<Evaluation Standard>

"A": The density of color developed is 0.5 or more.

"B": The density of color developed is less than 0.5.

| | | Amount in pressure-sensitive layer [% by mass] | | | | | | | |
|---|---|---|---|---|---|---|---|---|---|
| | | Color-developing layer | | | Color development-inducing layer | | | | |
| | Form of sheet | Microcapsule | Specific polymer compound | Others | Electron-accepting compound | | Specific polymer compound | Silica | others |
| Example 9 | Monosheet | Solution (B) | 13.9 | 0.8 | 0.3 | Activated clay | 30.8 | 22.4 | 30.8 | 1.0 |
| Example 10 | Monosheet | Solution (B) | 27.8 | 1.5 | 0.6 | Activated clay | 25.3 | 18.5 | 25.3 | 1.0 |
| Example 11 | Monosheet | Solution (B) | 27.8 | 1.5 | 0.6 | Activated clay | 50.6 | 18.5 | 0.0 | 1.0 |
| Example 12 | Monosheet | Solution (B) | 34.8 | 1.9 | 0.8 | Activated clay | 22.6 | 16.5 | 22.6 | 0.7 |
| Example 12 | Monosheet | Solution (B) | 27.8 | 1.5 | 0.6 | Activated clay | 25.3 | 18.5 | 25.3 | 1.0 |
| Example 13 | Monosheet | Solution (B) | 13.9 | 0.8 | 0.3 | Activated clay | 30.8 | 22.4 | 30.8 | 1.0 |
| Example 14 | Monosheet | Solution (B) | 27.8 | 1.5 | 0.6 | Salicylate | 25.3 | 18.5 | 25.3 | 1.0 |
| Comparative Example 2 | Monosheet | Solution (C) | — | — | — | Activated clay | — | — | — | — |

| | Physical properties | | | | | | | Evaluation result | |
|---|---|---|---|---|---|---|---|---|---|
| | Thickness of color-developing layer [μm] | Thickness of color development-inducing layer [μm] | Thickness T [μm] | Particle diameter $d_2$ of capsule [μm] | Inner diameter $p_2$ of capsule [μm] | $T/d_2$ | $T/P_2$ | Ra [μm] | Density gradation evaluation B (100 MPa~500 MPa) | Color development evaluation C (300 MPa) |
| Example 9 | 3 | 20 | 23 | 8 | 6.9 | 2.88 | 3.36 | 4.0 | A | A |
| Example 10 | 6 | 20 | 27 | 8 | 6.9 | 3.38 | 3.94 | 3.0 | A | A |
| Example 11 | 6 | 20 | 27 | 8 | 6.9 | 3.38 | 3.94 | 3.0 | B | A |
| Example 12 | 7 | 20 | 27 | 8 | 6.9 | 3.38 | 3.94 | 1.5 | B | A |
| Example 12 | 6 | 20 | 27 | 11 | 10.5 | 2.45 | 2.57 | 3.0 | A | A |
| Example 13 | 3 | 20 | 23 | 11 | 10.5 | 2.09 | 2.19 | 4.0 | A | A |
| Example 14 | 6 | 20 | 27 | 8 | 6.9 | 3.38 | 3.94 | 3.0 | B | B |
| Comparative Example 2 | — | — | — | 20 | 19.8 | — | — | — | C | A |

In Table 3, T is a thickness of the layer calculated by subtracting the thickness of the substrate from the thickness of the pressure measuring material, $T/p_2$ is the ratio of the thickness T to the inner diameter $p_2$ of the microcapsules, $T/d_2$ is the ratio of the thickness T to the particle diameter $d_2$ (average particle diameter) of the microcapsules, and Ra is the arithmetic mean roughness of the outermost surface (surface of the pressure-sensitive layer) on the side opposite to the substrate. All of these are values obtained by the methods described above.

In Table 3, "-" means that the content of the corresponding component is zero or the corresponding item is not measured.

EXPLANATION OF REFERENCES 10, 20: pressure measuring material
12, 22: substrate
14, 24: pressure-sensitive layer
24a: color-developing layer
24b: color development-inducing layer
15, 25: electron-accepting compound
16, 26: polymer matrix
18, 28: microcapsules
18a, 28a: capsule wall
18b, 28b: microcapsule inclusion (core material)

The entire disclosure of Japanese Patent Application No. 2019-006244, filed Jan. 17, 2019, is incorporated into the present specification by reference.

All documents, patent applications, and technical standards described in the present specification are incorporated into the present specification by reference, as if each of the documents, the patent applications, and the technical standards is specifically and individually described.

What is claimed is:

1. A pressure measuring material comprising:
a substrate; and
a pressure-sensitive layer,
wherein the pressure-sensitive layer contains a polymer matrix containing a polymer compound having a molecular weight of 1,000 or more, microcapsules encapsulating an electron-donating dye precursor and a solvent, and an electron-accepting compound,
wherein the pressure-sensitive layer has a color development-inducing layer having the electron-accepting compound and the polymer matrix and a color-developing layer having the microcapsules, and
a thickness of the color-developing layer is equal to or less than ½ of a thickness of the color development-inducing layer.

2. The pressure measuring material according to claim 1, wherein a density difference (ΔD2) calculated by subtracting the density of color developed by applying a pressure of 100 MPa from the density of color developed by applying a pressure of 500 MPa is 0.1 or more.

3. The pressure measuring material according to claim 1, wherein the electron-accepting compound includes acidic clay or activated clay.

4. The pressure measuring material according to claim 1, wherein the electron-accepting compound includes a metal salt of salicylic acid.

5. The pressure measuring material according to claim 1, wherein the pressure-sensitive layer has inorganic particles other than the electron-accepting compound.

6. The pressure measuring material according to claim 1, wherein the arithmetic mean roughness Ra of the outermost surface opposite to the substrate is 10.0 μm or less.

7. The pressure measuring material according to claim 6, wherein the arithmetic mean roughness Ra of the outermost surface opposite to the substrate is 2.0 µm to 10.0 µm.

8. The pressure measuring material according to claim 1, wherein a void volume is 5 mL/m² to 20 mL/m².

9. The pressure measuring material according to claim 1, wherein in a case where T represents a thickness of a layer calculated by subtracting a thickness of the substrate from a thickness of the pressure measuring material, and p represents an inner diameter of the microcapsules, a ratio T/p is 1.2 or more.

10. The pressure measuring material according to claim 9, wherein in a case where T represents the thickness of a layer calculated by subtracting a thickness of the substrate from a thickness of the pressure measuring material, and p represents the inner diameter of the microcapsules, the ratio T/p is 1.2 to 5.0.

11. The pressure measuring material according to claim 1, wherein a content of the polymer compound having a molecular weight of 1,000 or more is 10% by mass or more with respect to a total mass of the pressure-sensitive layer.

12. The pressure measuring material according to claim 1, wherein the substrate is a polyethylene terephthalate substrate or a polyethylene naphthalate substrate.

13. The pressure measuring material according to claim 1, further comprising:
    an easy adhesion layer between the substrate and the pressure-sensitive layer.

14. The pressure measuring material according to claim 1, wherein a wall material of the microcapsules includes at least one kind of material selected from polyurethane urea or polyurethane.

\* \* \* \* \*